US011753916B2

(12) United States Patent
Sharp et al.

(10) Patent No.: US 11,753,916 B2
(45) Date of Patent: Sep. 12, 2023

(54) INTEGRATED FRACKING SYSTEM

(71) Applicant: Stewart & Stevenson Manufacturing Technologies, LLC, Houston, TX (US)

(72) Inventors: Brian Sharp, Houston, TX (US); Chad Joost, Houston, TX (US); Chris Harvell, Houston, TX (US); Paul Smith, Houston, TX (US)

(73) Assignee: STEWART & STEVENSON LLC, Houston, TX (US)

(*) Notice: Subject to any disclaimer, the term of this patent is extended or adjusted under 35 U.S.C. 154(b) by 434 days.

(21) Appl. No.: 16/885,940

(22) Filed: May 28, 2020

(65) Prior Publication Data

US 2020/0378232 A1 Dec. 3, 2020

Related U.S. Application Data

(60) Provisional application No. 62/855,634, filed on May 31, 2019.

(51) Int. Cl.
*E21B 43/26* (2006.01)
*F04B 1/00* (2020.01)
*F04B 15/02* (2006.01)
*F04B 17/03* (2006.01)
*H01F 38/14* (2006.01)
*B01D 46/00* (2022.01)
*B01D 39/14* (2006.01)
*B60P 3/22* (2006.01)

(52) U.S. Cl.
CPC .......... *E21B 43/2607* (2020.05); *B60P 3/225* (2013.01)

(58) Field of Classification Search
None
See application file for complete search history.

(56) References Cited

U.S. PATENT DOCUMENTS

| | | | |
|---|---|---|---|
| 4,127,300 A * | 11/1978 | Melley | F02B 63/04 410/2 |
| 7,552,903 B2 | 6/2009 | Dunn et al. | |
| 8,607,930 B2 * | 12/2013 | Stewart | E06C 9/06 182/95 |
| 8,789,601 B2 | 7/2014 | Broussard et al. | |
| 9,410,410 B2 | 8/2016 | Broussard et al. | |
| 9,650,879 B2 | 5/2017 | Broussard et al. | |
| 9,893,500 B2 | 2/2018 | Oehring et al. | |
| 11,313,359 B2 | 4/2022 | Buckley et al. | |
| 2009/0092510 A1 | 4/2009 | Williams et al. | |
| 2015/0001161 A1* | 1/2015 | Wiemers | E21B 43/2607 210/201 |
| 2015/0104287 A1* | 4/2015 | Ryan | B65D 90/021 414/800 |
| 2015/0275891 A1 | 10/2015 | Chong | |
| 2016/0161188 A1 | 6/2016 | Chong et al. | |
| 2016/0273328 A1* | 9/2016 | Oehring | E21B 43/2607 |

(Continued)

*Primary Examiner* — Matthew Troutman
*Assistant Examiner* — Douglas S Wood
(74) *Attorney, Agent, or Firm* — Ewing & Jones, PLLC

(57) ABSTRACT

An integrated fracking system includes a substructure assembly including one or more frame rails. The integrated fracking system includes a pump subsystem having a frac pump and a motor. The pump subsystem is coupled to the frame rails of the substructure assembly. The integrated fracking system includes a variable frequency drive, a transformer, and a cooling subsystem, each coupled to the frame rails of the substructure assembly.

65 Claims, 33 Drawing Sheets

(56) References Cited

U.S. PATENT DOCUMENTS

| | | |
|---|---|---|
| 2017/0201141 A1 | 7/2017 | Rollins et al. |
| 2018/0328157 A1* | 11/2018 | Bishop ................... F04B 17/06 |
| 2019/0154020 A1 | 5/2019 | Glass |
| 2019/0309583 A1 | 10/2019 | Netecke |
| 2020/0109616 A1* | 4/2020 | Oehring .................. F04B 17/03 |
| 2020/0109617 A1 | 4/2020 | Oehring et al. |
| 2020/0263528 A1* | 8/2020 | Fischer ................... E21B 21/08 |
| 2020/0325760 A1* | 10/2020 | Markham ............... E21B 43/26 |
| 2020/0378232 A1 | 12/2020 | Sharp et al. |
| 2021/0131411 A1 | 5/2021 | Oehring et al. |

\* cited by examiner

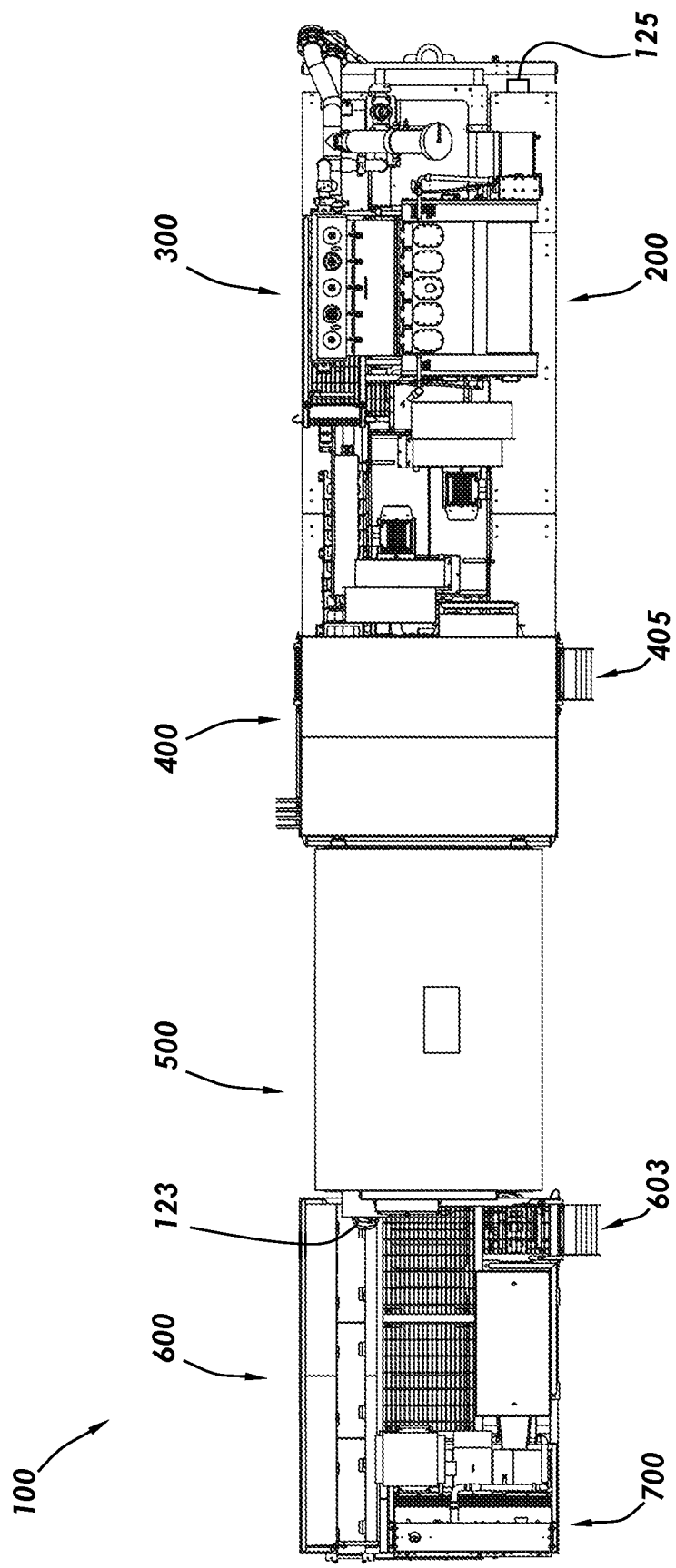

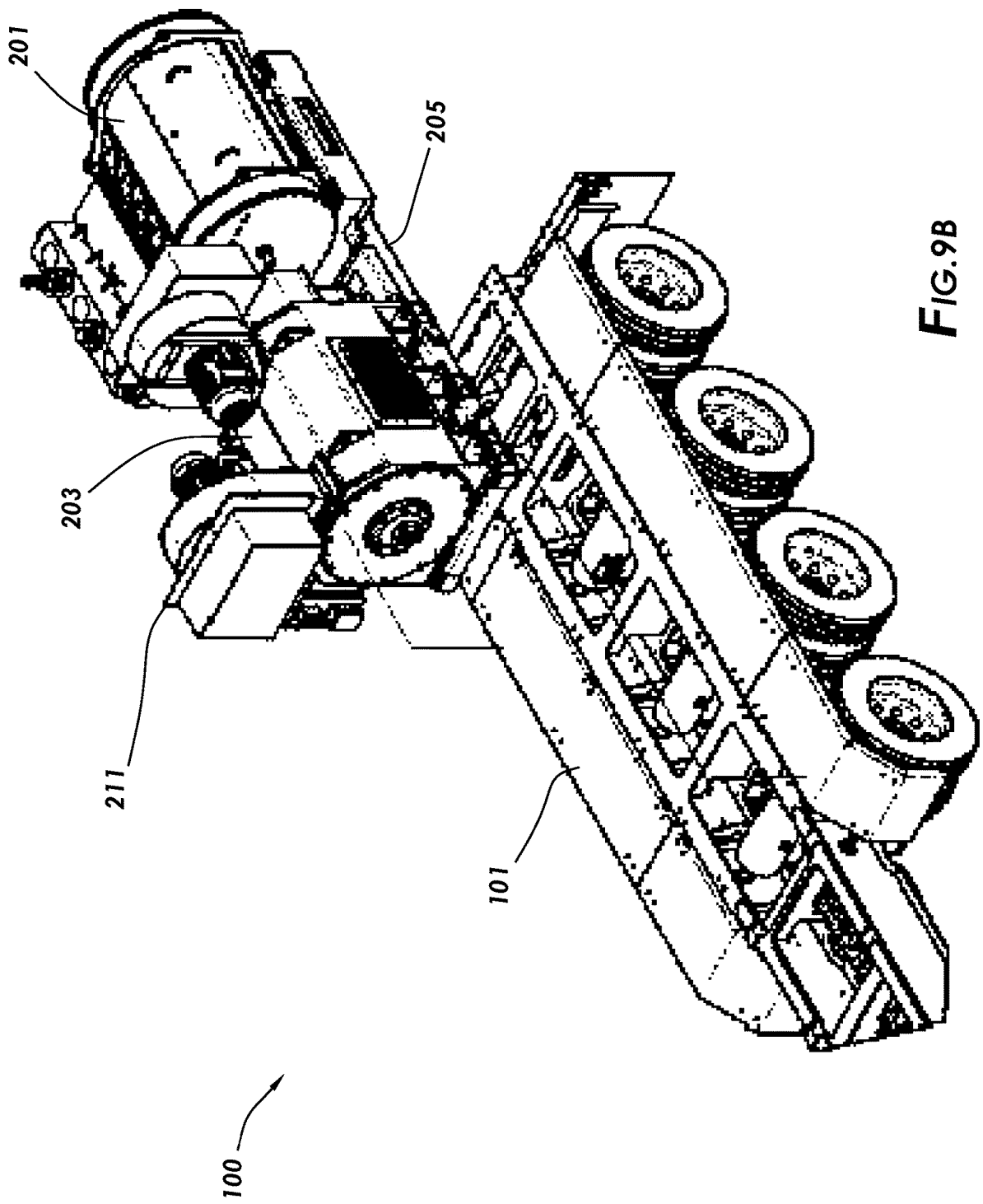

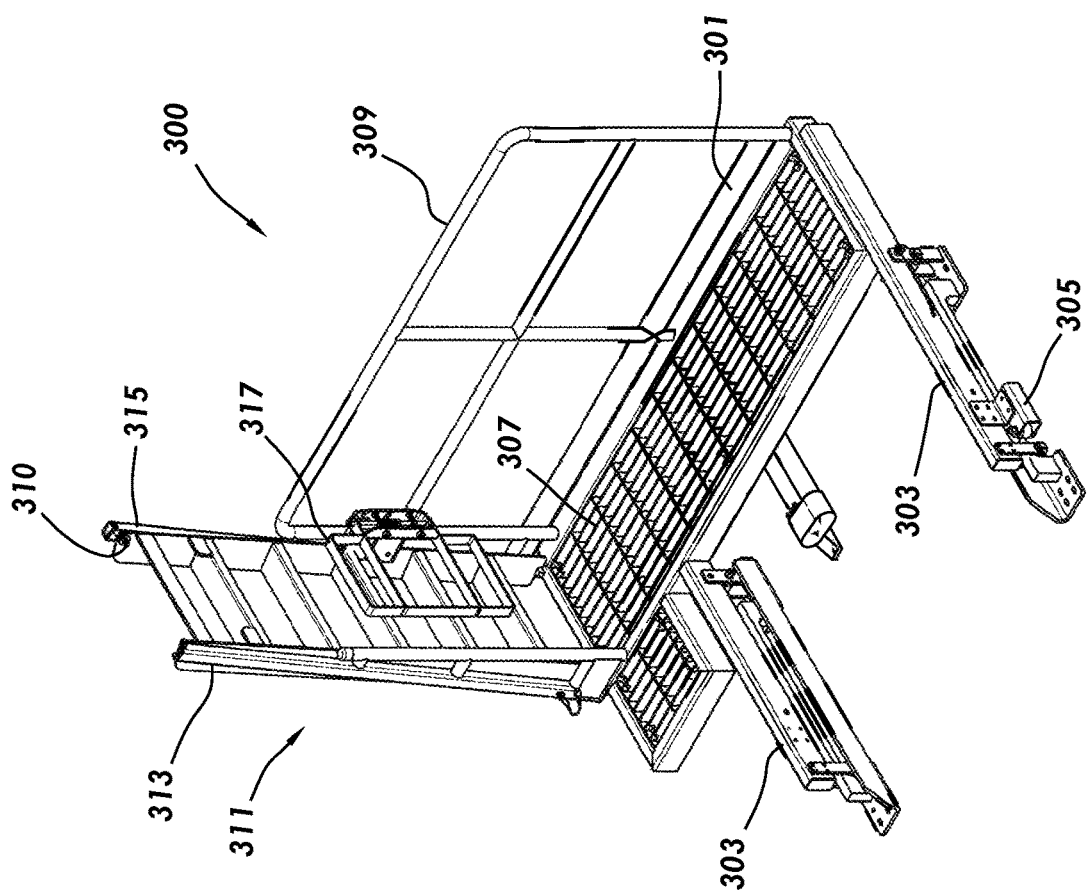
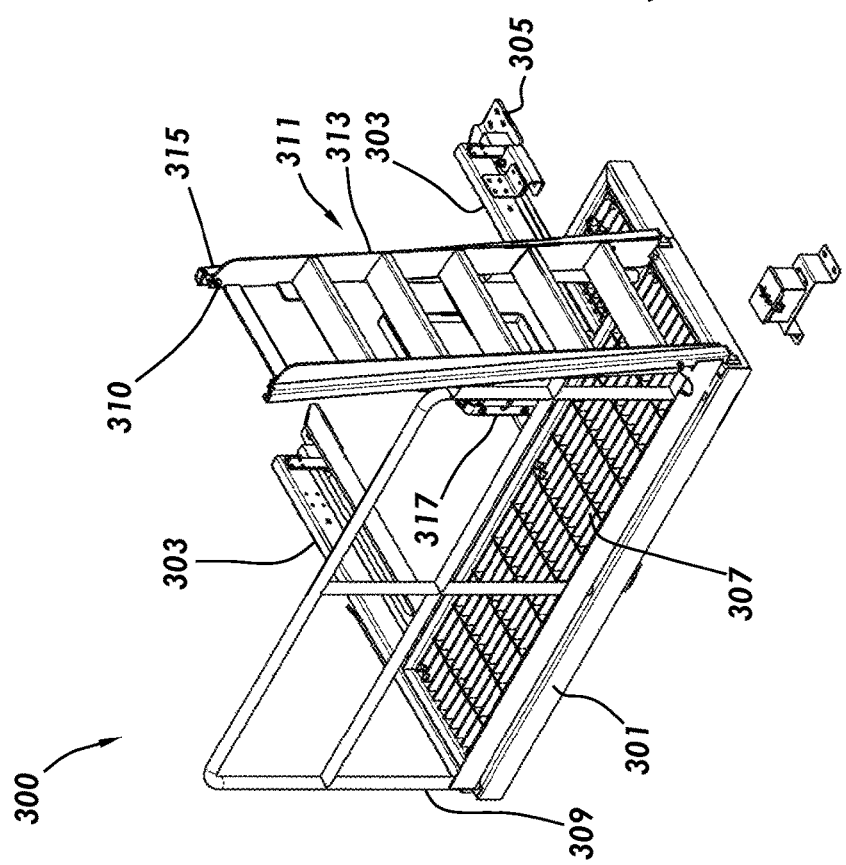

INTEGRATED FRACKING SYSTEM

CROSS-REFERENCE TO RELATED APPLICATIONS

This application is a non-provisional application that claims priority from U.S. provisional application No. 62/855,634, filed May 31, 2019, which is hereby incorporated by reference in its entirety.

TECHNICAL FIELD/FIELD OF THE DISCLOSURE

The present disclosure relates to wellsite equipment, specifically to wellsite equipment used for hydraulic fracturing.

BACKGROUND OF THE DISCLOSURE

Hydraulic fracturing, referred to herein as fracking, is a method used to enhance hydrocarbon recovery from certain downhole formations. Fracking involves the injection of high-pressure fluid into the downhole formation to induce fracturing of the formation. A proppant is typically included in the fluid used for fracturing. The proppant enters the fractures and retards the closure of the fractures once the fracking operation is completed. The fractures produced may provide additional flow channels for hydrocarbons to escape the formation.

Multiple pieces of wellsite equipment are used during a fracking operation including pumps used to supply the fracturing fluid to the formation, referred to herein as frac pumps. Frac pumps are typically driven by diesel motors. Frac pumps require the use of multiple other pieces of wellsite equipment to function, each of which must be operatively coupled in order to undertake a fracking operation.

SUMMARY

The present disclosure provides for an integrated fracking system. The integrated fracking system includes a substructure assembly including one or more frame rails. The integrated fracking system includes a pump subsystem including a frac pump and a motor. The pump subsystem is coupled to the frame rails of the substructure assembly. The integrated fracking system includes a variable frequency drive coupled to the frame rails of the substructure assembly. The integrated fracking system includes a transformer coupled to the frame rails of the substructure assembly. The integrated fracking system includes a cooling subsystem coupled to the frame rails of the substructure assembly.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 2 depicts a top view of the integrated fracking system of FIG. 1.

FIG. 9B depicts a partial perspective exploded view of an integrated fracking system consistent with at least one embodiment of the present disclosure.

FIG. 11 depicts a perspective view of a movable platform of the slide-out platform subsystem of FIG. 10.

FIG. 12 depicts an alternative perspective view of a movable platform of the slide-out platform subsystem of FIG. 10.

FIG. 14A depicts a detail side elevation view of a bellows assembly consistent with at least one embodiment of the present disclosure.

DETAILED DESCRIPTION

Figure 1:
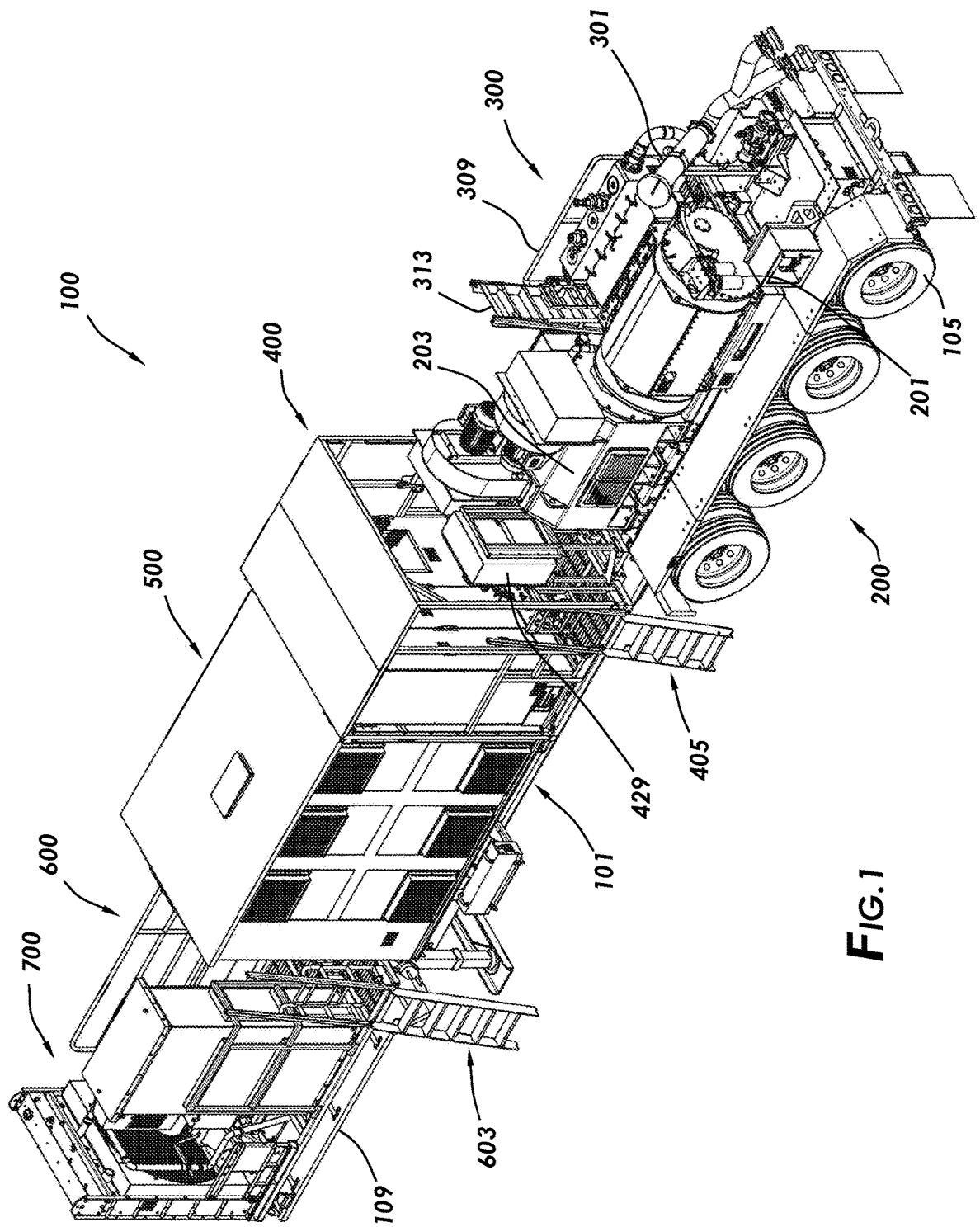
FIG. 1 depicts a perspective view of an integrated fracking system consistent with at least one embodiment of the present disclosure.
Figure 1A:
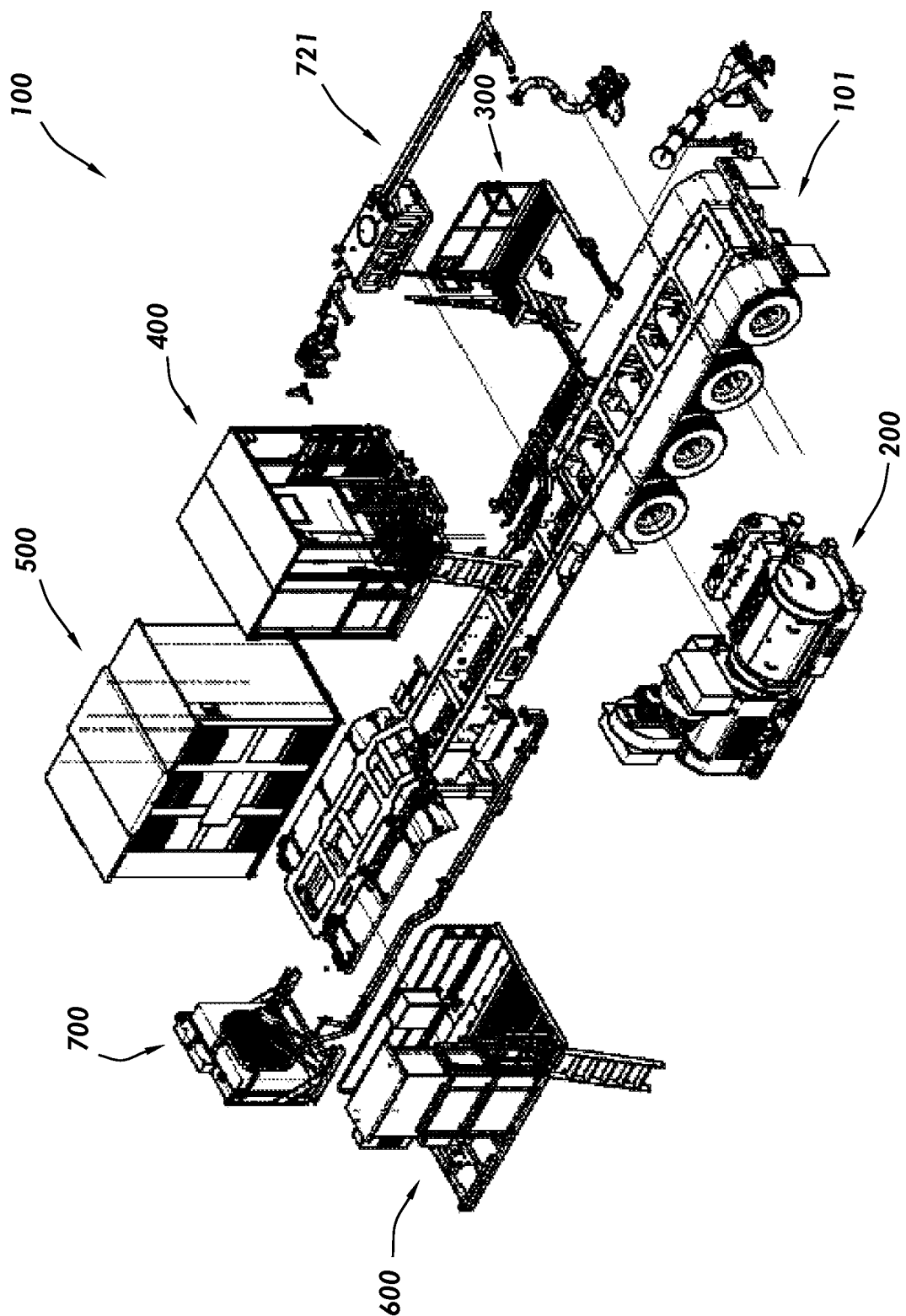
FIG. 1A depicts an exploded view of the integrated racking system of FIG. 1.
Figure 3:
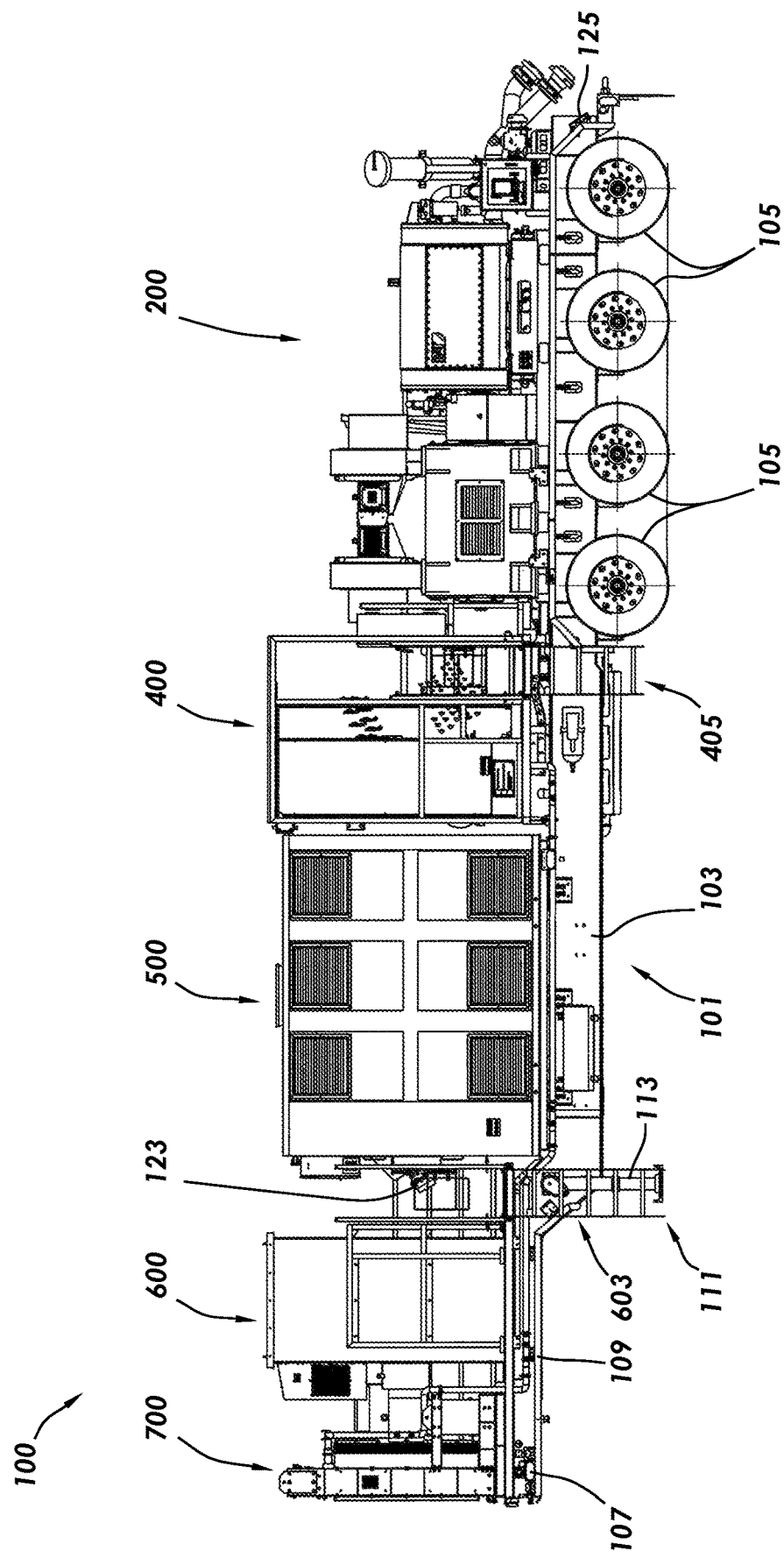
FIG. 3 depicts a side elevation view of the integrated fracking system of FIG. 1.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIGS. 1-5 depict integrated fracking system 100. Integrated fracking system 100 may be transportable as a single unit. In some embodiments, integrated fracking system 100 may be configured to be road-transportable as a trailer, truck, or part of a trailer or truck. In other embodiments, integrated fracking system 100 may be configured as a skid. In the embodiments shown in FIGS. 1-5, integrated fracking system 100 is configured as a trailer.

In some embodiments, integrated fracking system 100 may include multiple subsystems including, for example and without limitation, pump subsystem 200, slide-out platform subsystem 300, variable frequency drive (VFD) subsystem 400, transformer subsystem 500, front platform subsystem 600, cooling subsystem 700, each of which is further discussed herein below. In some embodiments, each such subsystem may be transported together. In some embodiments, integrated fracking system 100 may be configured such that the subsystems thereof remain operatively connected.

Figure 6:
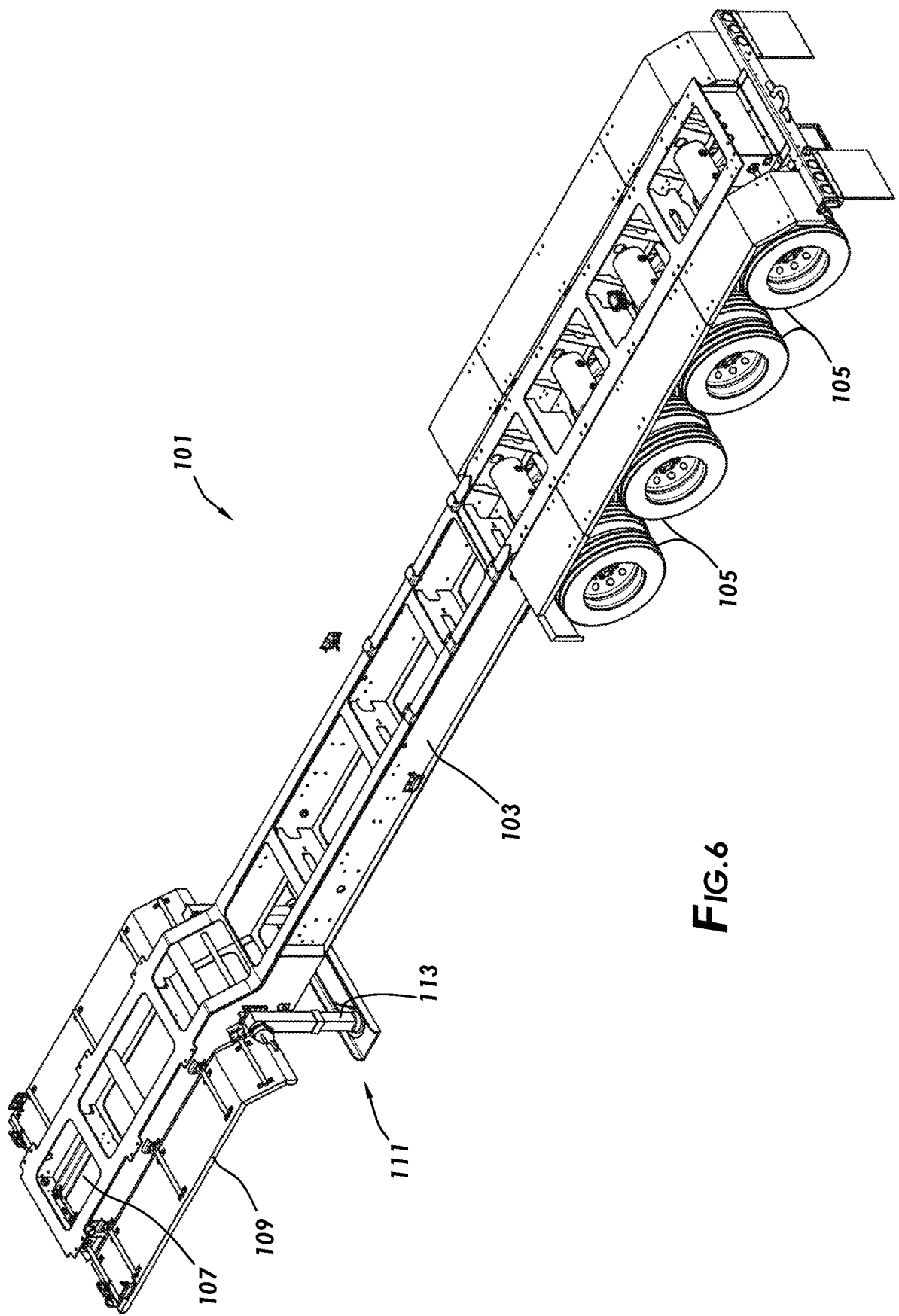
FIG. 6 depicts a perspective view of a substructure assembly of an integrated fracking system consistent with at least one embodiment of the present disclosure.

In some embodiments, as shown in FIG. 6, integrated fracking system 100 may include substructure assembly 101. In some embodiments, substructure assembly 101 may be part of a truck or may make up at least part of a trailer. Substructure assembly 101 may provide support for each subsystem of integrated fracking system 100, as each such subsystem may couple to substructure assembly 101. Substructure assembly 101 may include one or more frame rails 103 positioned to support the subsystems of integrated fracking system 100. Substructure assembly 101 may further include wheels 105 for use in transporting integrated fracking system 100. Substructure assembly 101 may include coupler 107 where substructure assembly 101 is part of a trailer. Coupler 107 may be used, for example, to couple integrated fracking system 100 to a truck for transportation of integrated fracking system 100. In some embodiments, substructure assembly 101 may include gooseneck 109. Gooseneck 109 may assist with the transportability of integrated fracking system 100 when integrated fracking system 100 is coupled to a truck.

In some embodiments, substructure assembly 101 may include leveling system 111. Leveling system 111 may include one or more legs 113 coupled to substructure assembly 101 and positioned to extend from substructure assembly 101 to the ground once integrated fracking system 100 is transported to the desired location. In some embodiments, legs 113 may be extended or retracted such that substructure assembly 101 and the subsystems of integrated fracking system 100 are level during operation thereof. In some embodiments, legs 113 may be retractable such that legs 113 do not interfere with the transportation of integrated fracking system 100.

Figure 7:
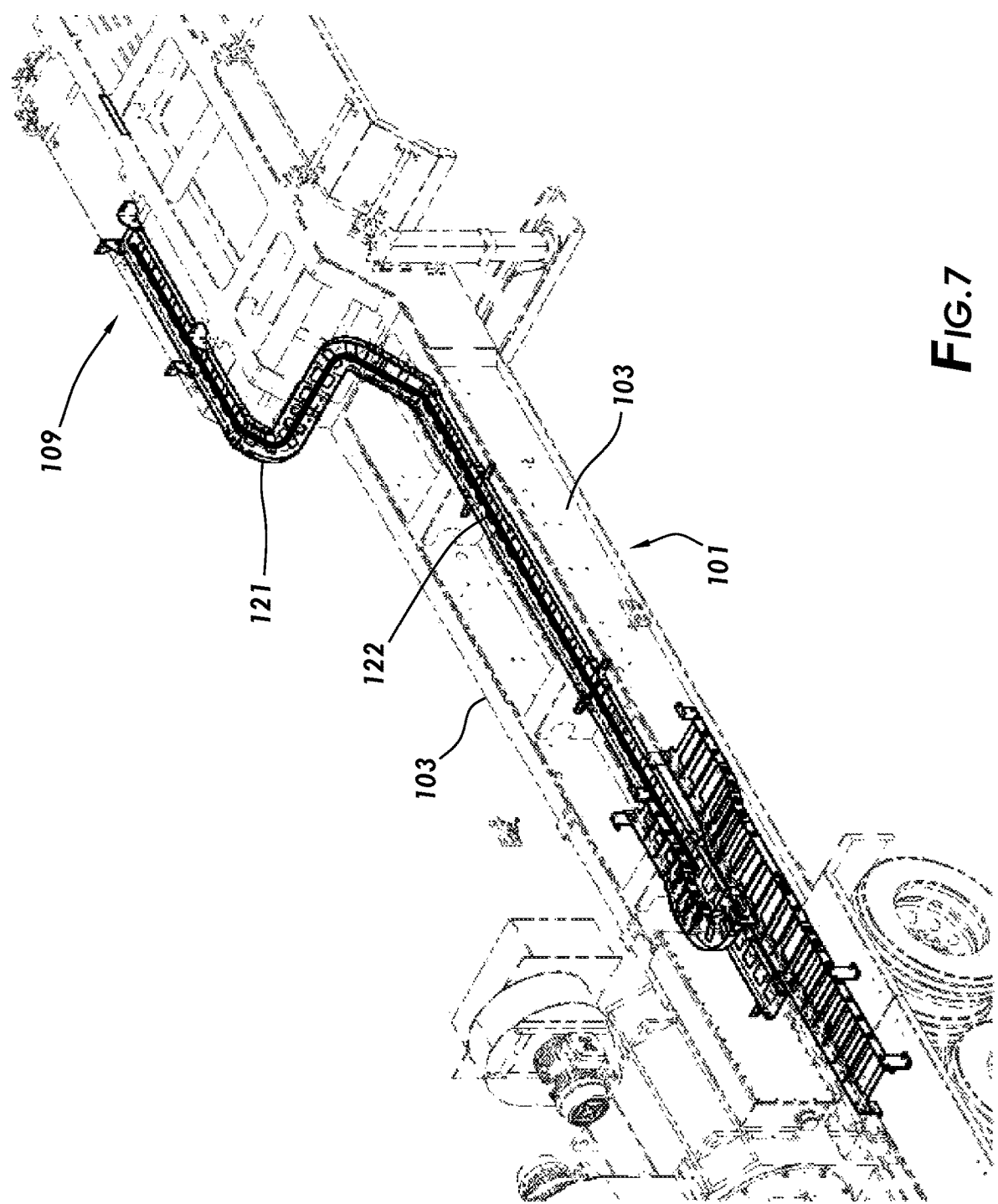
FIG. 7 depicts a perspective view of a cable tray positioned on a substructure assembly of an integrated fracking system consistent with at least one embodiment of the present disclosure.

In some embodiments, substructure assembly 101 may include cable tray 121 as shown in FIG. 7. Cable tray 121 may be positioned between and coupled to frame rails 103 of substructure assembly 101 and may extend from the front of substructure assembly 101 at gooseneck 109 to the rear end of substructure assembly 101. In some embodiments, cable tray 121 may extend beneath the subsystems of integrated fracking system 100 and may be used to house one or more cables and lines including, for example and without limitation, electrical power cables, data or communication cables, hydraulic lines, pneumatic lines, or any other cable or line used in integrated fracking system 100. In some embodiments, the cables and lines within cable tray 121 may remain operatively coupled to the subsystems of integrated fracking system 100 during transportation such that the need to reconnect each cable or line each time integrated fracking system 100 is to be put into use is reduced. In some embodiments, cable tray 121 may extend between front platform subsystem 600 and other subsystems of integrated fracking system 100 such that integrated motor controller 615 as further described below may be operatively coupled to other systems of integrated fracking system 100.

Figure 4:
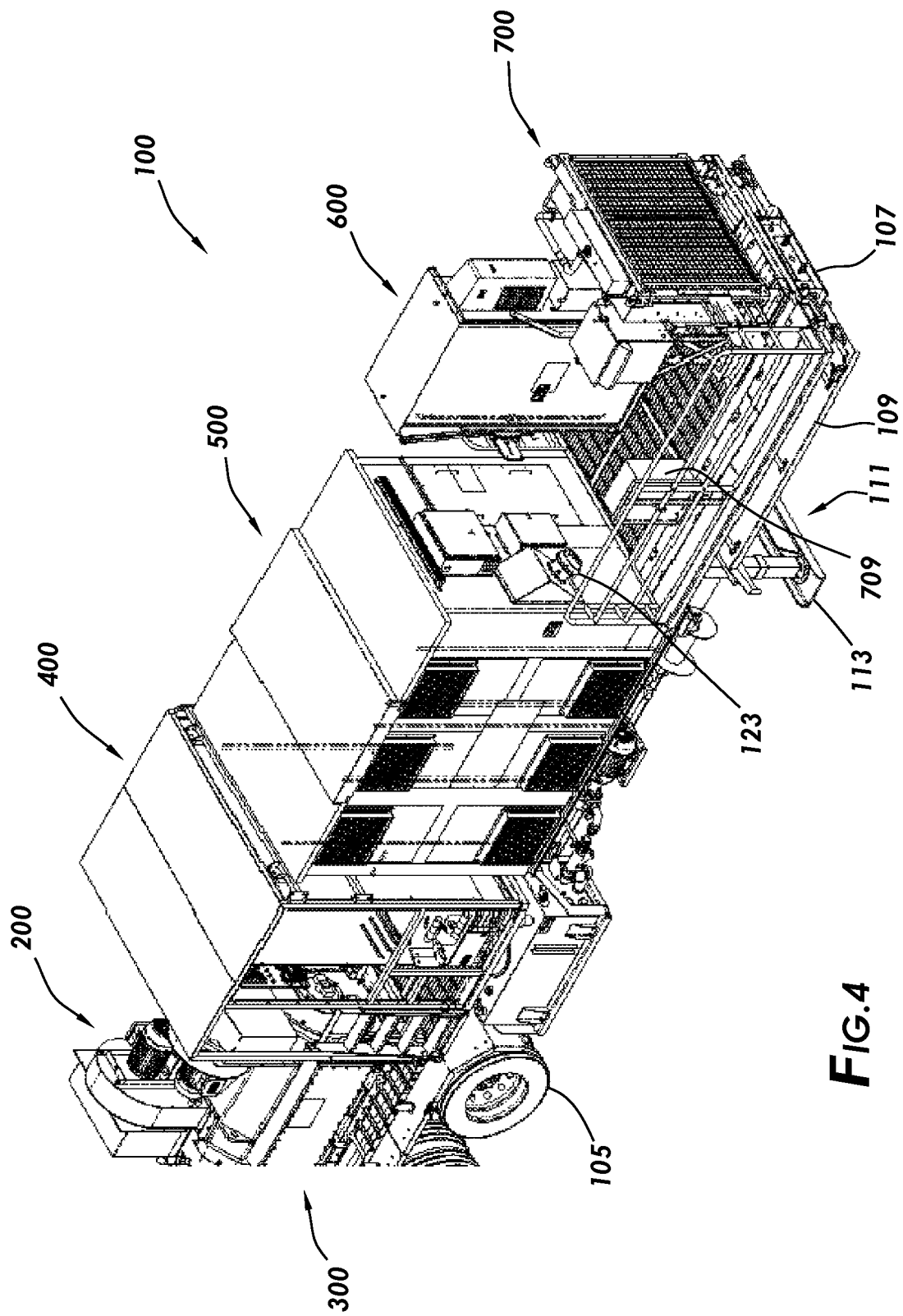
FIG. 4 depicts a perspective view of the front of the integrated fracking system of FIG. 1.
Figure 5:
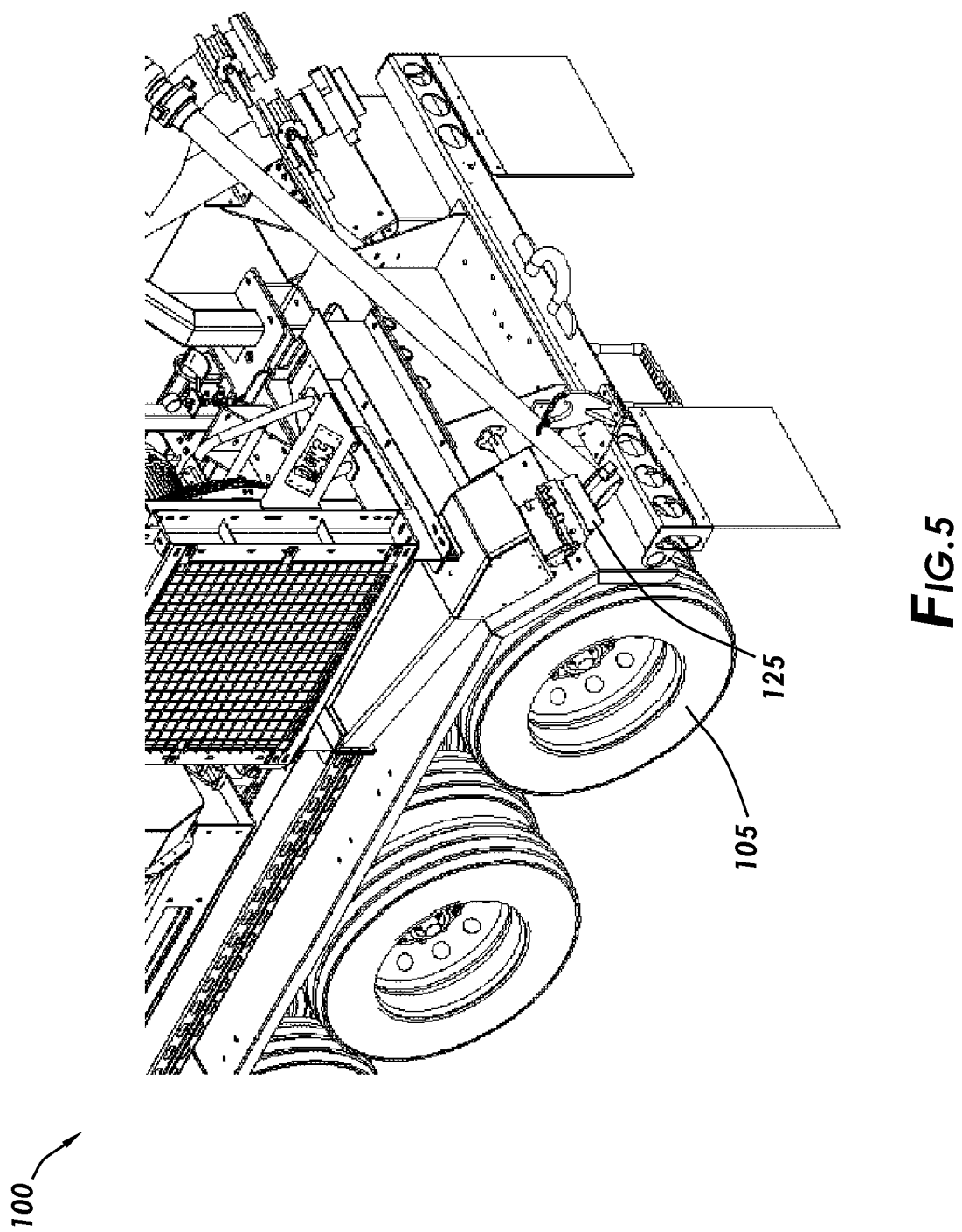
FIG. 5 depicts a detail view of the rear of the integrated fracking system of FIG. 1.

In some embodiments, cable tray 121 may include a main power line, referred to herein as a primary input cable 122, positioned to receive electrical power from an external power supply at with a single connection to integrated fracking system 100. In some embodiments, the primary input cable 122 may include a connection at one or both ends of cable tray 121 such that electrical power may be provided to integrated fracking system 100 from either the front or rear end of integrated fracking system 100. In some embodiments, power supply may be coupled to the primary input cable 122 of integrated fracking system 100 at a location spaced apart from a hazardous piece of equipment depending on the mode of operation of integrated fracking system 100. In some embodiments, the primary input cable 122 may extend to transformer subsystem 500 as further described herein below. Front power receptacle 123 consistent with at least one embodiment of the present disclosure is depicted in FIG. 4. In some embodiments, front power receptacle 123 may be positioned on or be directly coupled to transformer subsystem 500 or may be positioned on gooseneck 109. Rear power receptacle 125 consistent with at least one embodiment of the present disclosure is depicted in FIG. 5. In some embodiments, integrated fracking system 100 may be provided with only front power receptacle 123 or rear power receptacle 125.

For example, with reference to FIG. 1, where pump subsystem 200 is in operation, access to rear power receptacle 125 may be rendered difficult by the operation of components of pump subsystem 200 whereas front power receptacle 123 may be relatively accessible. Similarly, in other situations where cooling subsystem 700 is in operation, front power receptacle 123 of integrated fracking system 100 may be exposed to high heat or high pressures or otherwise inaccessible. In such a situation, rear power receptacle 125 may be more safely accessed.

Figure 8:
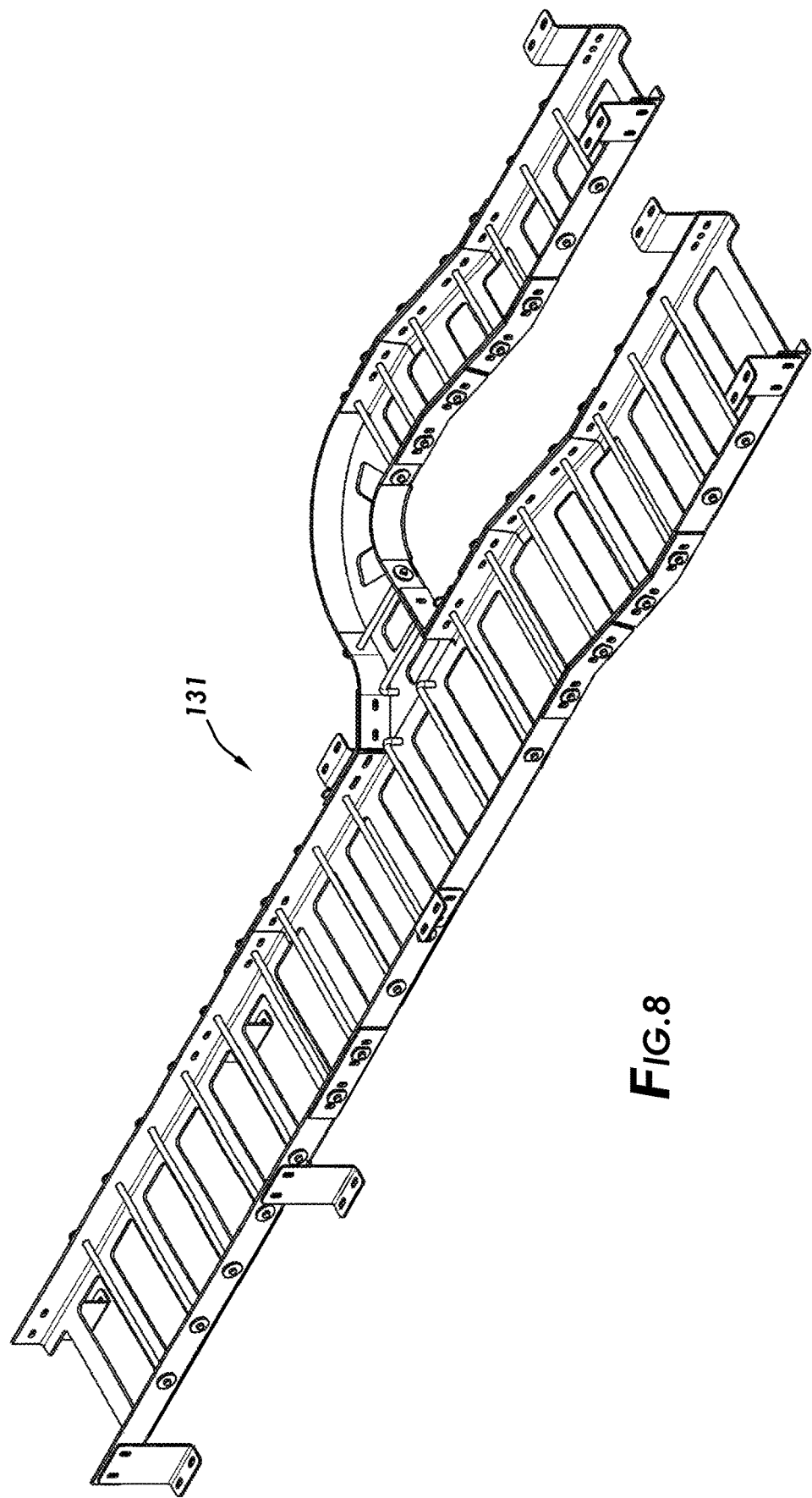
FIG. 8 depicts a perspective view of a cable tray of an integrated fracking system consistent with at least one embodiment of the present disclosure.

In some embodiments, substructure assembly 101 may include additional cable trays such as cable tray 131 depicted separately in FIG. 8. Cable tray 131 may extend between VFD subsystem 400 and pump subsystem 200 as further described below and may support one or more electric cables including power supply cables and communications cables that extend between VFD subsystem 400 and pump subsystem 200. Cable tray 131 may allow for the electrical connections between VFD subsystem 400 and pump subsystem 200 to remain in operative communication during transportation of integrated fracking system 100.

Figure 9:
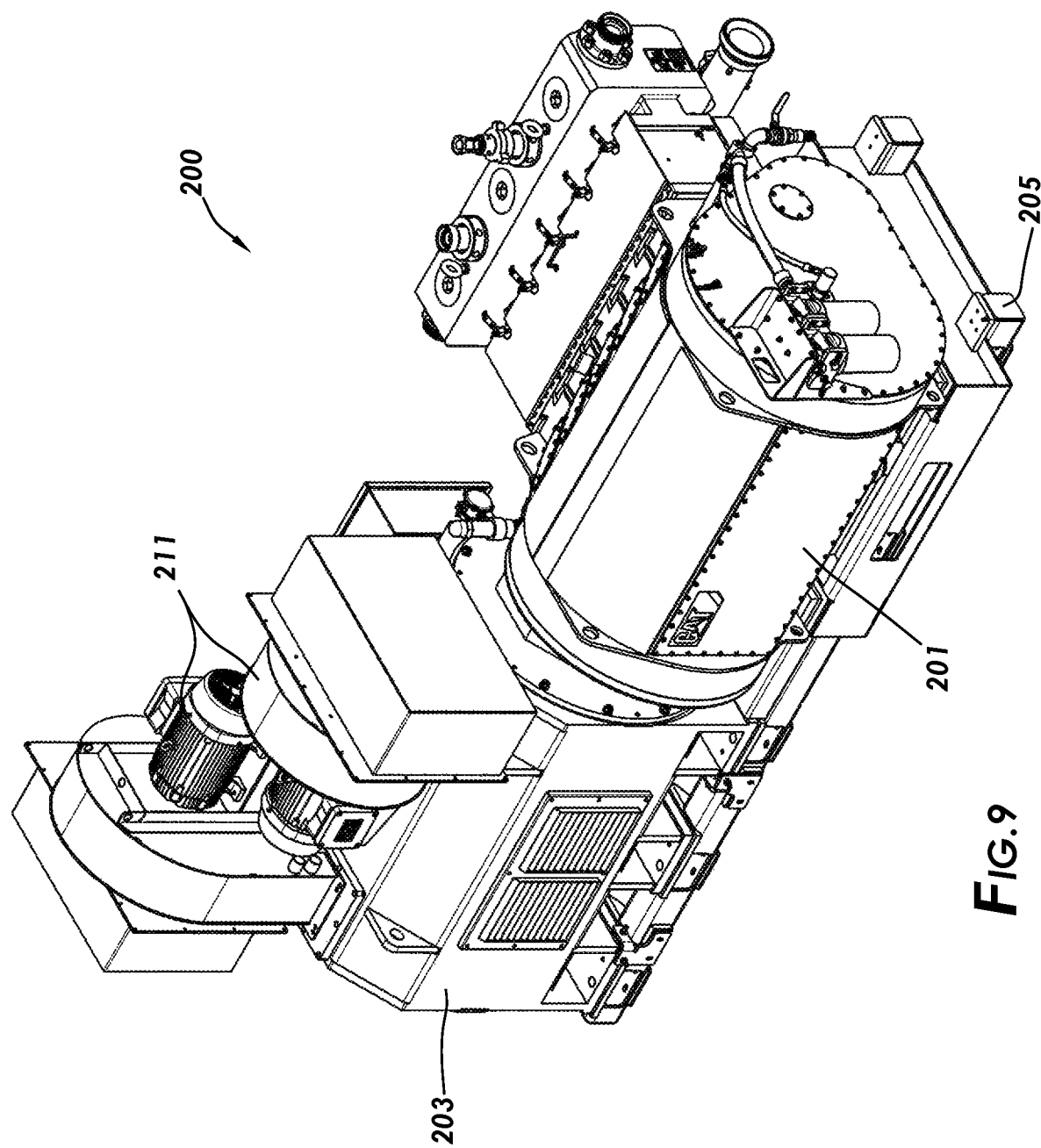
FIG. 9 depicts a perspective view of a pump subsystem of an integrated fracking system consistent with at least one embodiment of the present disclosure.

With reference to FIG. 1, integrated fracking system 100 may include pump subsystem 200. In some embodiments, pump subsystem 200 may be located at a rear location on integrated fracking system 100. In some embodiments, as depicted in FIG. 9, pump subsystem 200 may include frac pump 201 and motor 203. Motor 203 may be electrically powered. Pump subsystem 200 may be coupled to frame rails 103.

Figure 9A:
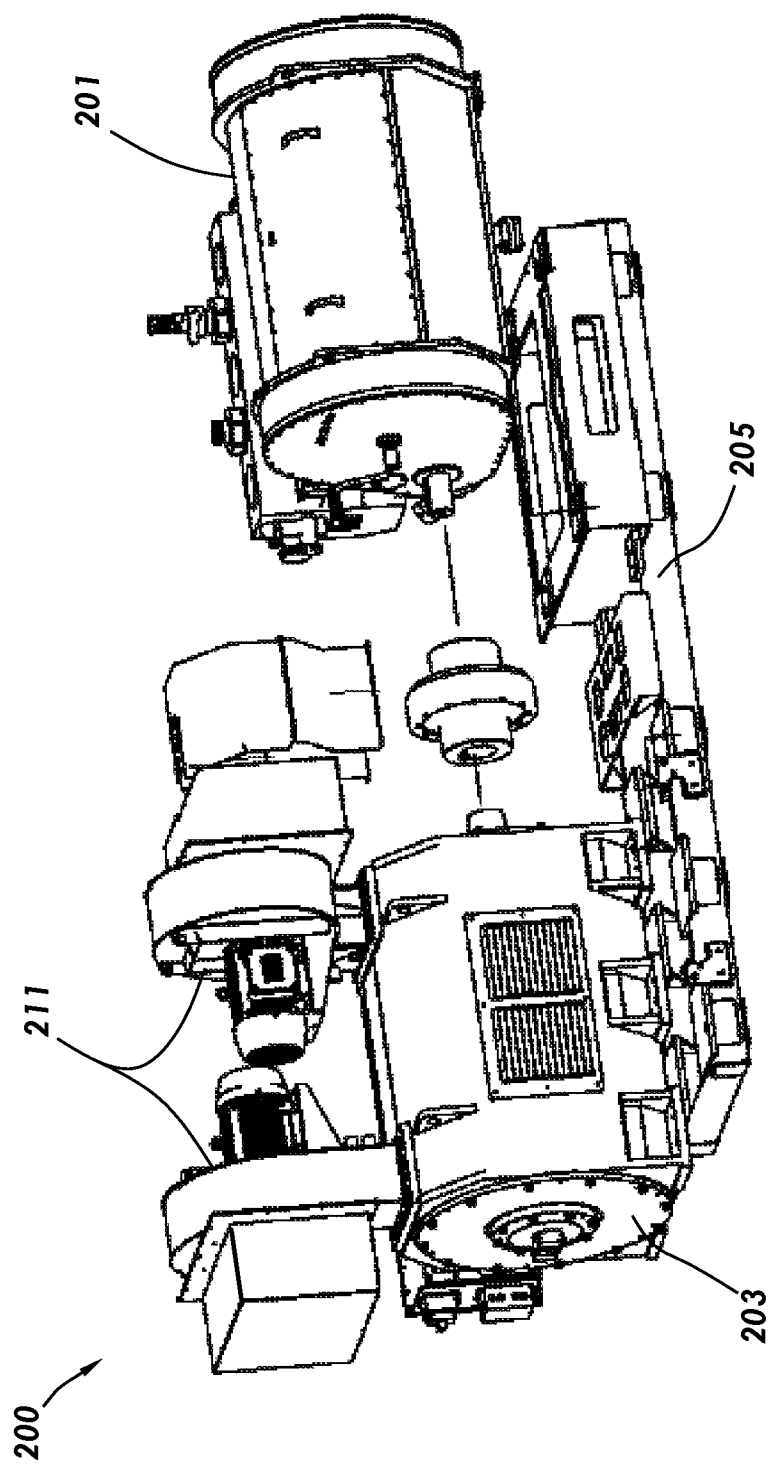
FIG. 9A depicts an exploded view of the pump subsystem of FIG. 9.

In some embodiments, frac pump 201 and motor 203 may be coupled to frac pump skid 205 as shown in an exploded view in FIG. 9A. Frac pump skid 205 may be selectively decoupleable from substructure assembly 101 of integrated fracking system as shown in FIG. 9B such that frac pump 201 and motor 203 may be assembled apart from substructure assembly 101. Such an arrangement may, for example and without limitation, allow for frac pump skid 205 to be specifically configured for the specific configuration of frac pump 201 and motor 203, thereby making the process of mounting and aligning frac pump 201 and motor 203 simpler than an arrangement in which such mounting and alignment were done to substructure assembly 101 directly. Additionally, in some embodiments, the use of such a frac pump skid 205 separate from substructure assembly 101 may allow frac pumps 201 and motors 203 having different configurations to be used with integrated fracking system 100 by using different frac pump skids 205. In some embodiments, each such frac pump skid 205 may be adapted to be received by substructure assembly 101 of integrated fracking system 100. Additionally, by coupling frac pump 201 and motor 203 to frame rails 103 of substructure assembly 101 with frac pump skid 205, frac pump 201 and motor 203 may be removed and replaced with a replacement pump subsystem 200 in the case of failure of frac pump 201 or motor 203.

As further shown in FIG. 9A, in some embodiments, pump subsystem 200 may include motor cooling system 211. Motor cooling system 211 may include, for example and without limitation, one or more electrically driven fans positioned on motor 203.

Figure 10:
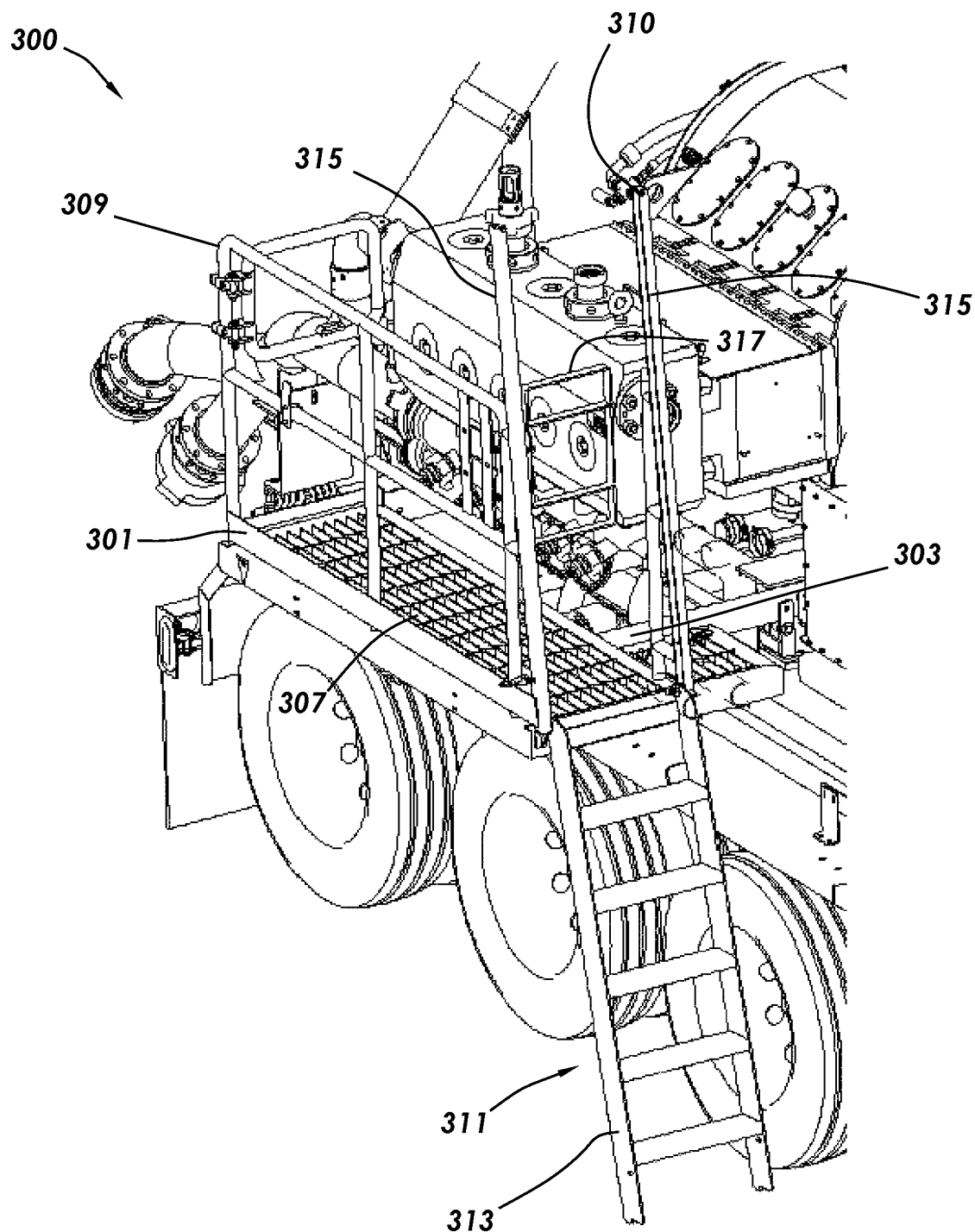
FIG. 10 depicts a perspective view of a slide-out platform subsystem of an integrated fracking system consistent with at least one embodiment of the present disclosure.

In some embodiments, with reference to FIG. 1, integrated fracking system 100 may include slide-out platform subsystem 300. Slide-out platform subsystem 300 may, in some embodiments, be located adjacent to pump subsystem 200. In such embodiments, slide-out platform subsystem 300 may include movable platform 301, shown in the retracted position in FIG. 1 and in the extended position in FIG. 10. With reference to FIGS. 10-12, movable platform 301 may be slidably coupled to frame rails 103 of substructure assembly 101 by one or more slide rails 303. In some embodiments, movable platform 301 may move between a retracted position and an extended position manually. In some embodiments, movable platform 301 may move between a retracted position and an extended position by one or more actuators 305. In some embodiments, actuators 305 may be electrically powered. Actuators 305 may include, for example and without limitation, a screw drive, a chain drive, a worm drive, or a linear actuator. Movable platform 301 may include floor 307. In some embodiments floor 307 may be formed as a grated floor.

In some embodiments, movable platform 301 may include safety railings 309. In some embodiments, movable platform 301 may include ladder assembly 311. Ladder assembly 311 may include ladder 313 and handrails 315. Handrails 315 may be rigidly coupled to and may extend upward from floor 307. In some embodiments, ladder 313 may be pivotably coupled to floor 307 such that ladder 313 may pivot between a raised position and a lowered position. In other embodiments, ladder 313 may be slidingly coupled to handrails 315 such that ladder 313 may slide between the raised and lowered positions. When in the raised position, ladder 313 may be located within the perimeter of floor 307 such that movable platform 301 may be positioned in the retracted position. When in the lowered position, ladder 313 may extend from floor 307 to the ground such that floor 307 of movable platform 301 may be accessible via ladder 313. In some embodiments, ladder 313 may extend between floor 307 and the ground. In some embodiments, ladder 313 may extend vertically or may extend at an angle to the vertical, such as at an angle between 0° and 60°, 5° and 45°, or 5° and 25° to the vertical. In such an embodiment, use of ladder 313 positioned at an angle to the vertical may be simplified as compared to a vertical ladder.

In some embodiments, ladder 313 may be positioned within handrails 315 when ladder 313 is in the raised position as shown in FIGS. 11 and 12. In some embodiments, one or more retaining mechanisms 310 may be positioned in ladder 313 or handrails 315 which may be used to retain ladder 313 in the raised position. For example, in some embodiments, retaining mechanism 310 may include a shaft, such as for example, a bolt adapted to pass through a hole formed in each of ladder 313 and handrails 315 such that ladder 313 remains in the raised position when retaining mechanism 310 is positioned therein. In some embodiments, a securing device such as a cotter pin or nut may be used to retain retaining mechanism 310 in the locked position.

In some embodiments, movable platform 301 may include safety gate 317. Safety gate 317 may be positioned to extend across the opening between handrails 315. Safety gate 317 may be pivotably coupled to handrails 315 or safety railings 309 such that safety gate 317 pivots only inwardly, thereby preventing or reducing the chances that a user will inadvertently step off of floor 307 in the direction of ladder assembly 311.

When in the retracted position, movable platform 301 may, in some embodiments, remain within the outer perimeter of substructure assembly 101 to facilitate transportation of integrated fracking system 100. Movable platform 301 may be extended such that equipment of integrated fracking system 100 may be more easily accessible. For example and without limitation, as depicted in FIG. 10, where movable platform 301 is located adjacent pump subsystem 200, access to frac pump 201 may be facilitated by the extension of movable platform 301. Ladder 313 may be lowered to the ground, allowing a user to access floor 307 of movable platform 301 and thereby access frac pump 201 and motor 203.

Figure 13:
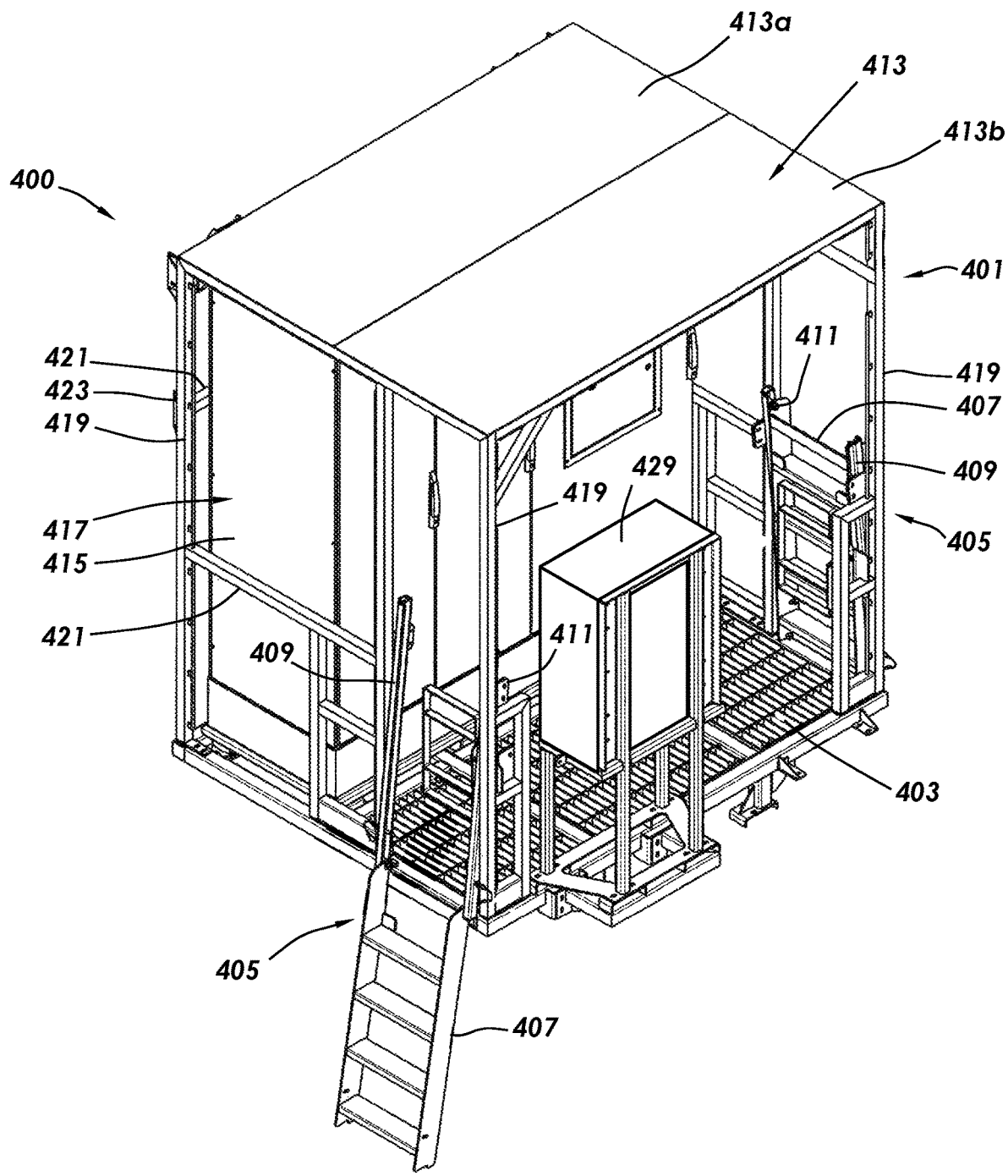
FIG. 13 depicts a perspective view of a variable frequency drive subsystem of an integrated fracking system consistent with at least one embodiment of the present disclosure.
Figure 14:
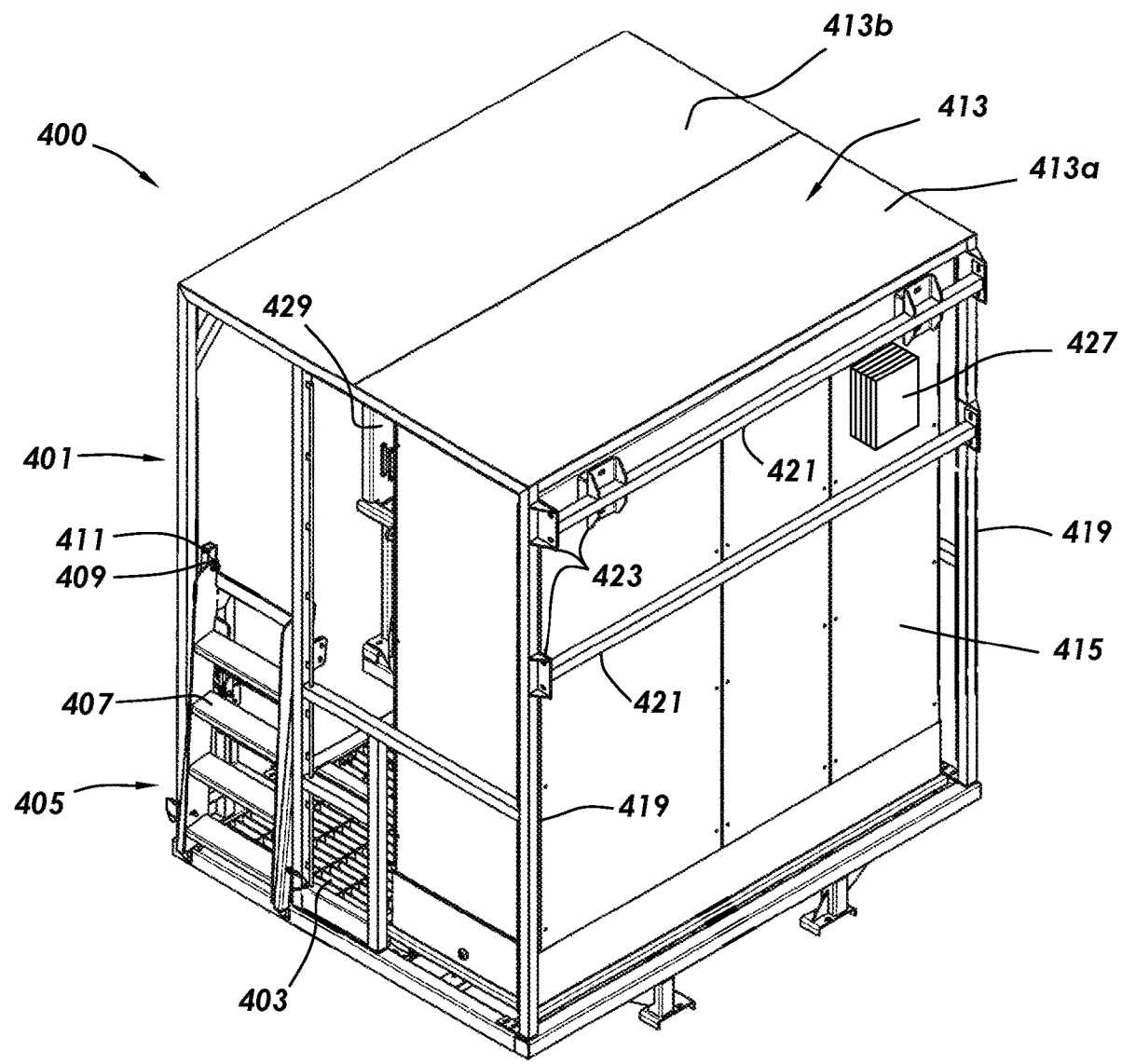
FIG. 14 depicts an alternative perspective view of the variable frequency drive subsystem of FIG. 13.
Figure 15:
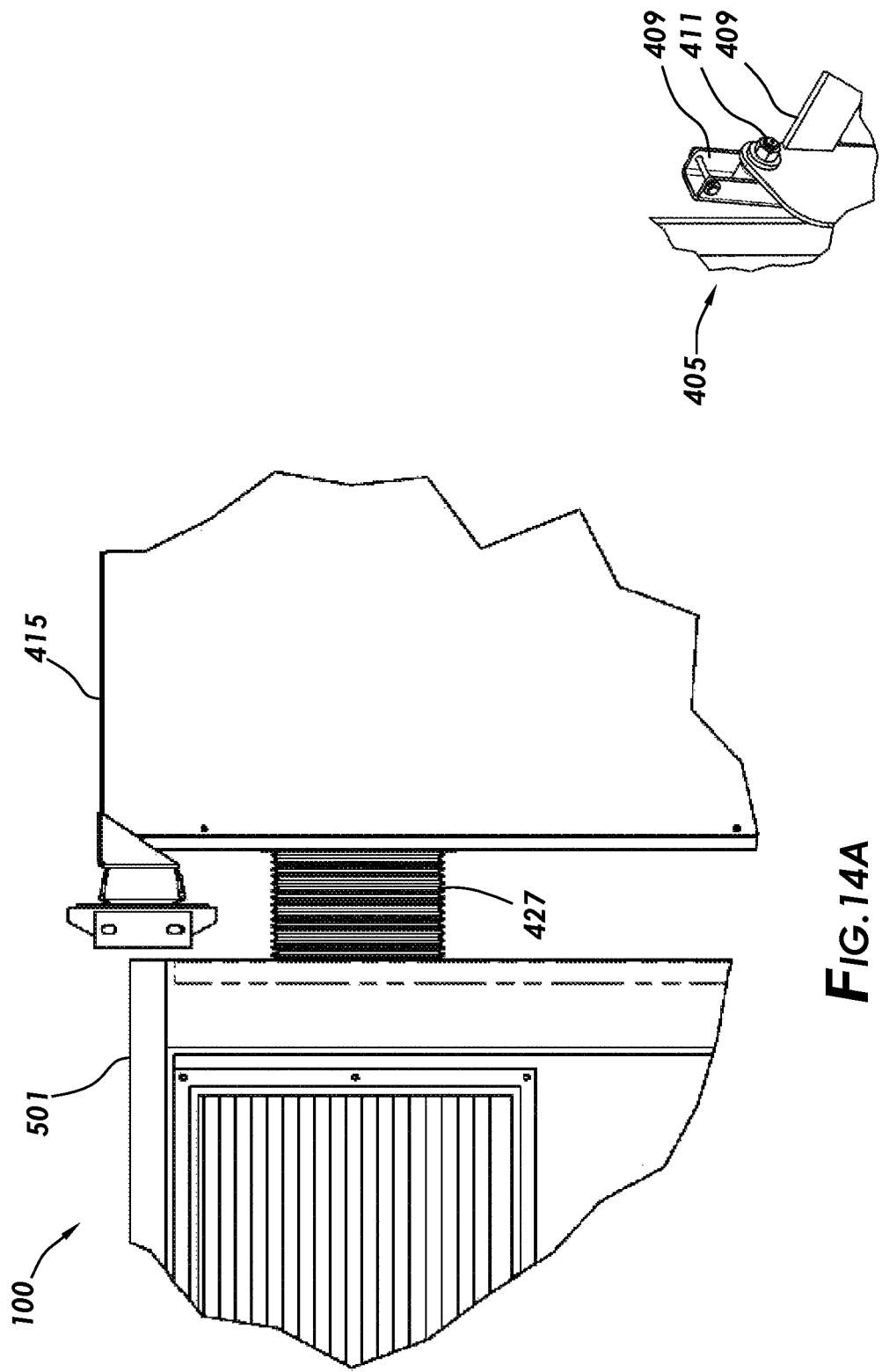
FIG. 15 depicts a detail view of the variable frequency drive subsystem of FIG. 14.
Figure 16:
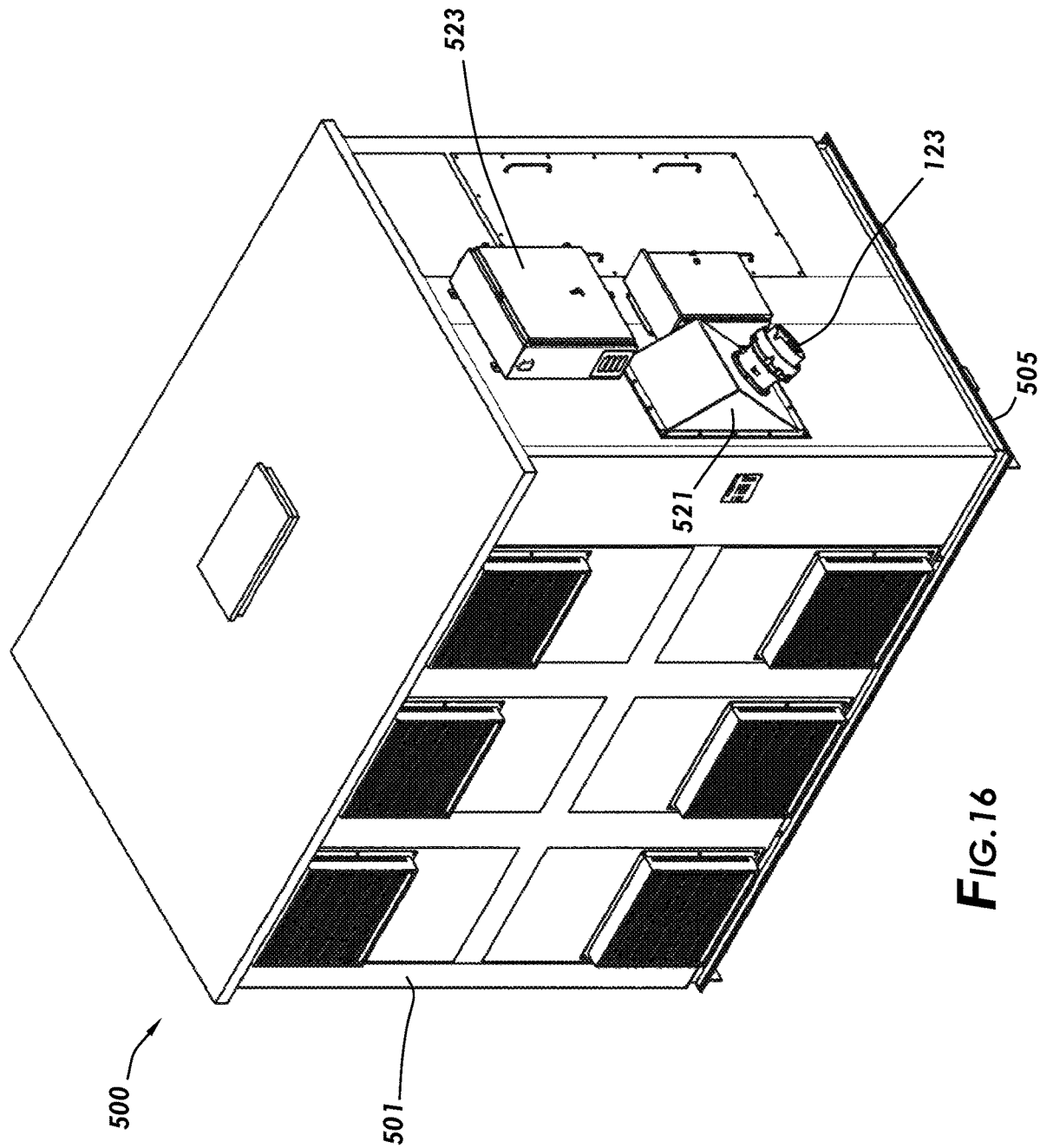
FIG. 16 depicts a perspective view of a transformer subsystem of an integrated fracking system consistent with at least one embodiment of the present disclosure.
Figure 17:
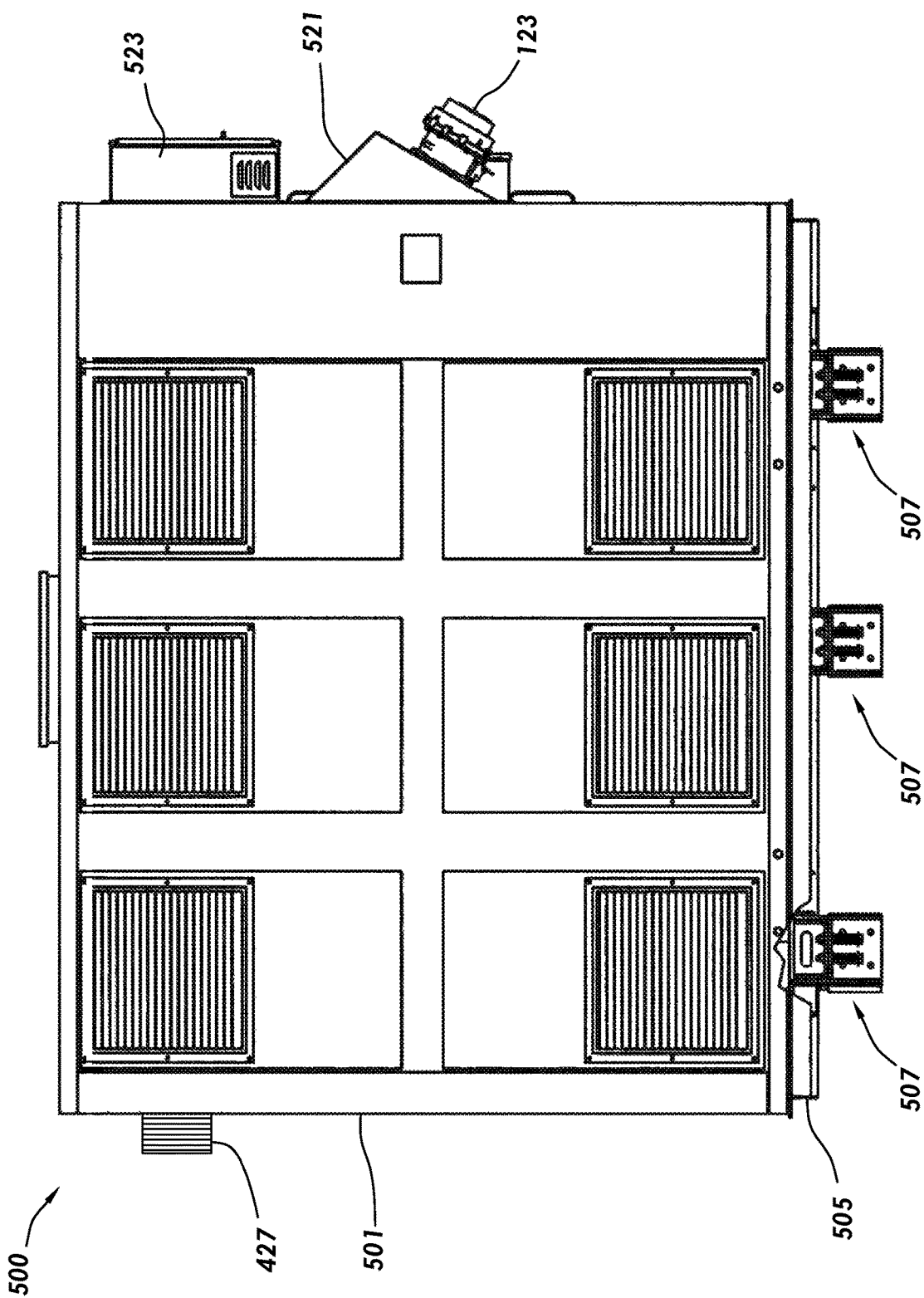
FIG. 17 depicts a side elevation view of the transformer subsystem of FIG. 16.
Figure 18:
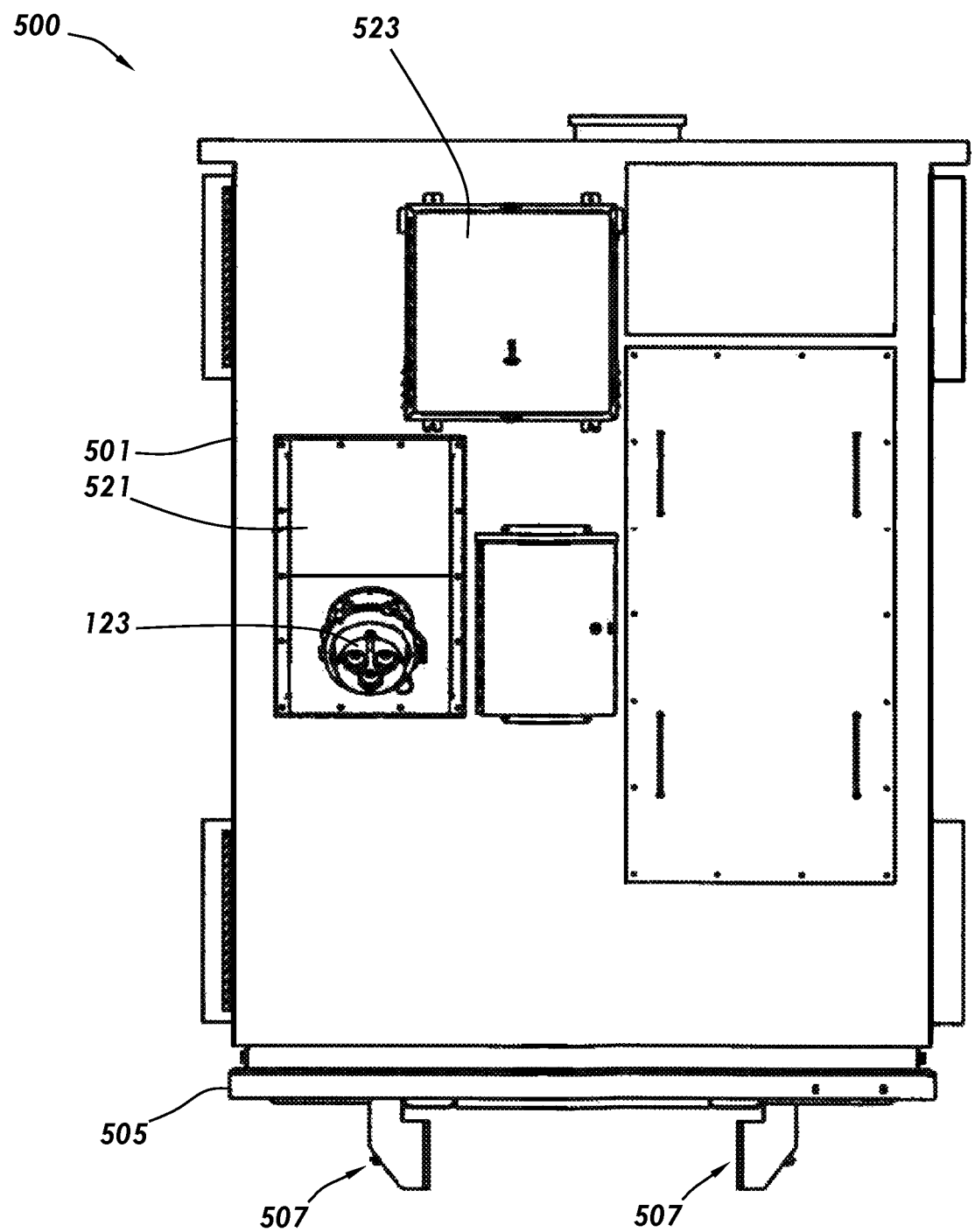
FIG. 18 depicts an end elevation view of the transformer subsystem of FIG. 16.

In some embodiments, with reference to FIG. 1, integrated fracking system 100 may include VFD subsystem 400. VFD subsystem 400 may be mechanically coupled to substructure assembly 101, such as to frame rails 103. VFD subsystem 400, as shown in FIGS. 13-15, may be positioned within environmental shelter 401.

VFD subsystem 400 may include VFD platform 403, accessible from the ground by one or more ladder assemblies 405. Each ladder assembly 405 may include ladder 407 and handrails 409. Handrails 409 may be rigidly coupled to and may extend upward from VFD platform 403. In some embodiments, ladder 407 may be pivotably coupled to VFD platform 403 such that ladder 407 may pivot between a raised position and a lowered position. In other embodiments, ladder 407 may be slidingly coupled to handrails 409 such that ladder 407 may slide between the raised and lowered positions. When in the raised position, ladder 407 may be located within the perimeter of VFD platform 403. When in the lowered position, ladder 407 may extend from VFD platform 403 to the ground such that VFD platform 403 may be accessible via ladder 407. In some embodiments, ladder 407 may extend to the ground at an angle from VFD platform 403, In such an embodiment, use of ladder 407 may be simplified as compared to a vertical ladder.

In some embodiments, ladder 407 may be positioned within handrails 409 when ladder 407 is in the raised position. In some embodiments, one or more retaining mechanisms 411 (as shown in FIG. 15) may be positioned in ladder 407 or handrails 409 which may be used to retain ladder 407 in the raised position.

Figure 13A:
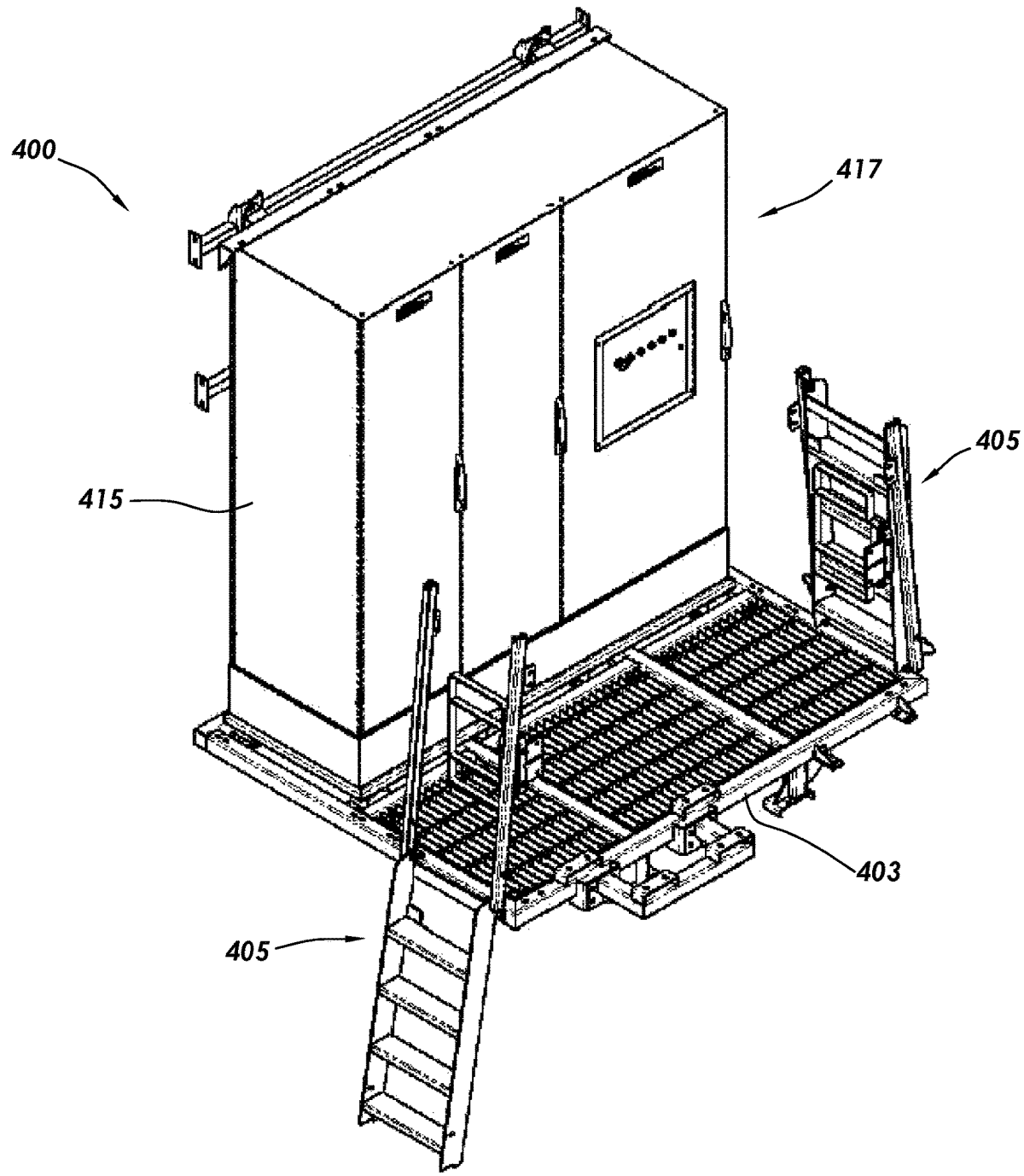
FIG. 13A depicts a perspective view of the variable frequency drive subsystem of FIG. 13 with canopy removed.

In some embodiments, environmental shelter 401 may include canopy 413. In some embodiments, canopy 413 may be removable as shown in FIG. 13A. In some embodiments, canopy 413 may be adapted to protect equipment on VFD subsystem 400 and users on VFD platform 403 from environmental conditions including, for example and without limitation, precipitation and sunlight. In some embodiments, canopy 413 may be formed from two subcomponents, referred to herein as canopy sections 413a and 413b. In some embodiments, canopy sections 413a and 413b may be independently removable from environmental shelter 401.

In some embodiments, one of the canopy sections, herein described as canopy section 413a, may be positioned above VFD enclosure 415 and the other, herein described as canopy section 413b, may be positioned above VFD platform 403. In such an embodiment, access to VFD 417 within VFD enclosure 415 may be granted by removal of canopy section 413a alone. In such an embodiment, canopy section 413b may remain in place such that canopy section 413b acts as a protective element for a user on VFD platform 403, such as during removal of VFD 417 from VFD enclosure 415.

Figure 13B:
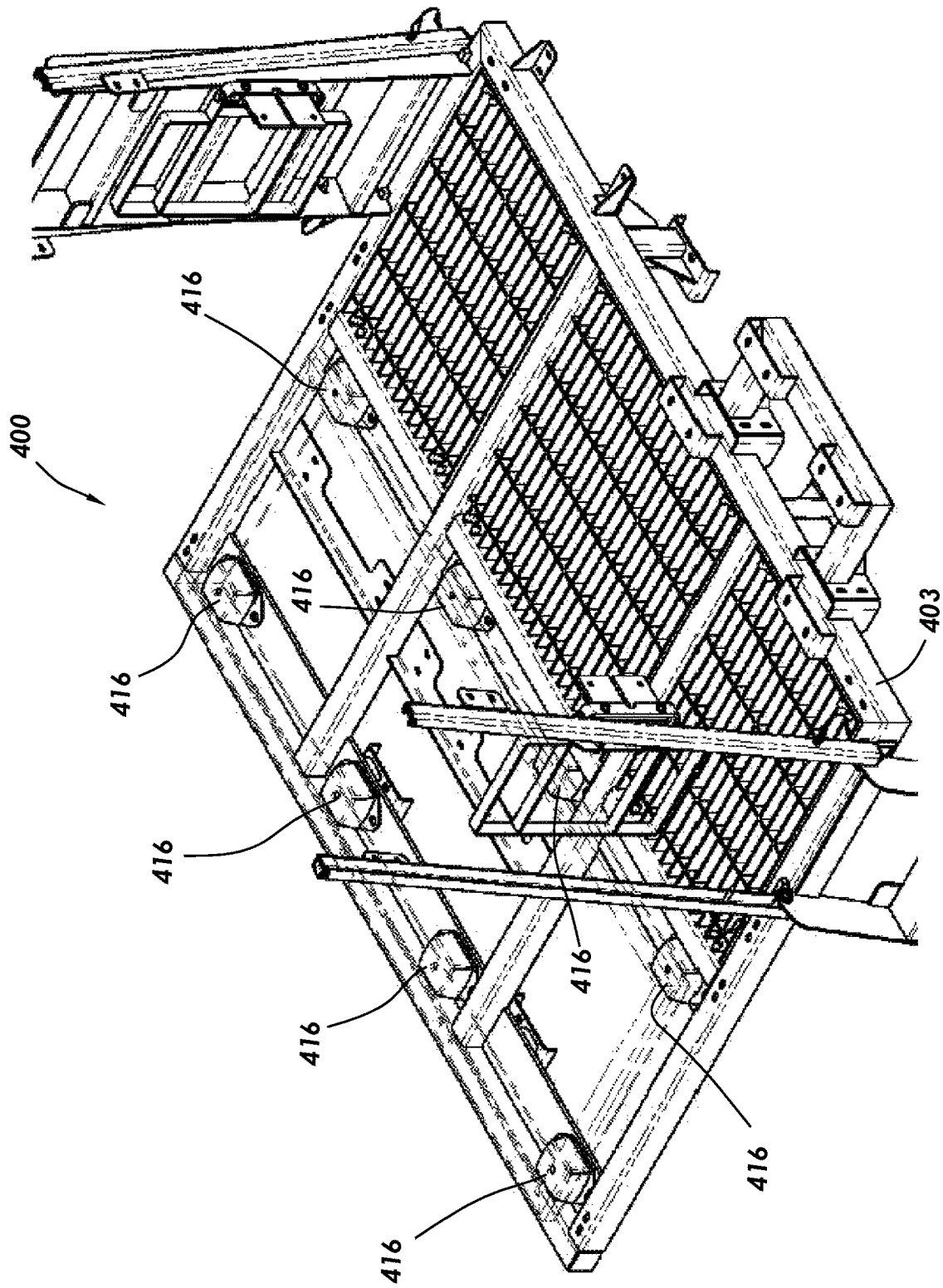
FIG. 13B depicts a perspective view of the platform of the variable frequency drive subsystem of FIG. 13.

In some embodiments, VFD enclosure 415 may protect VFD 417 from the surrounding environment and may protect users from encountering high voltages within VFD enclosure 415. VFD enclosure 415 may, in some embodiments, be secured to VFD platform 403 by one or more vibration isolation mounts. FIG. 13B depicts VFD platform 403 with VFD enclosure 415 removed therefrom such that VFD isolation mounts 416 are visible. VFD enclosure 415 may be mechanically coupled to VFD platform 403 via VFD isolation mounts 416 to, for example and without limitation, provide vibration and motion damping between VFD enclosure 415 and substructure assembly 101 during transportation of integrated fracking system 100. Such damping may, without being bound to theory, mitigate the risk of damaging VFD 417 as well as causing damage to substructure assembly 101 due to movement or torsional loading caused by VFD 417 during travel over uneven terrain.

In some embodiments, VFD enclosure 415 may include one or more vertical supports 419. Vertical supports 419 may be coupled to VFD platform 403 and may support canopy 413. In some embodiments, VFD enclosure may include one or more stabilizer bars 421 passing between vertical supports 419. In some embodiments, each stabilizer bar 421 may be coupled to vertical supports 419 through a vibration isolator 423.

Figure 13C:
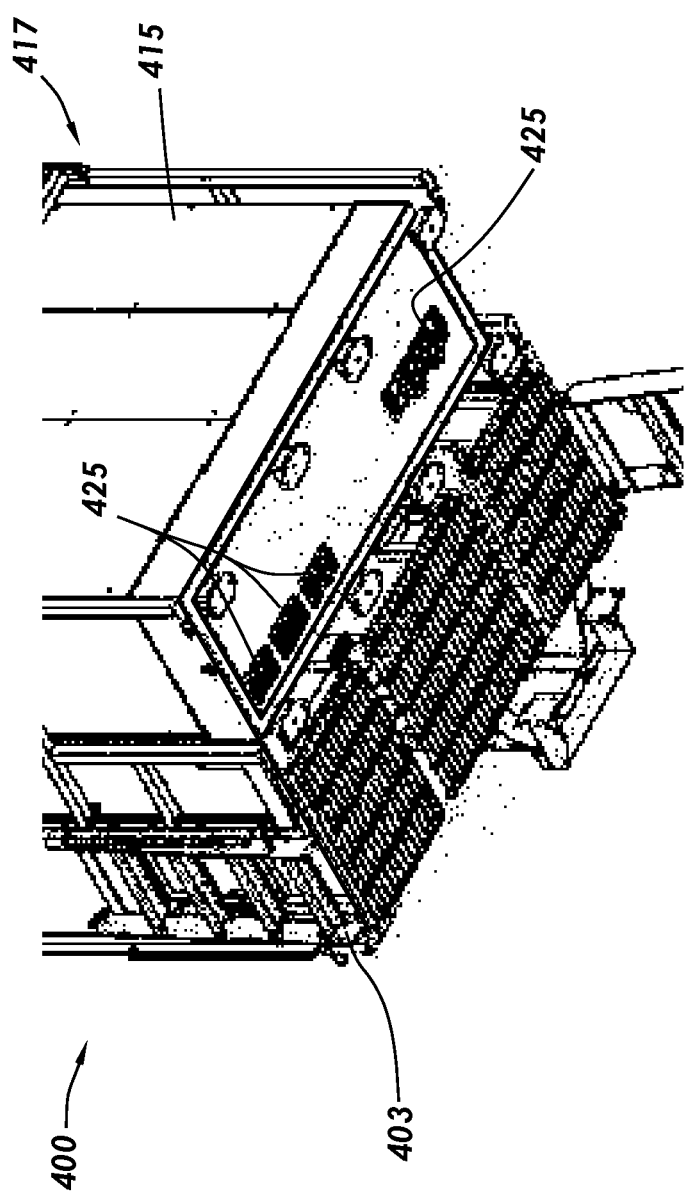
FIG. 13C depicts a perspective view of the underside of the variable frequency drive subsystem of FIG. 13.

In some embodiments, VFD enclosure 415 may include one or more openings 425 for receiving electrical power cables. For example, FIG. 13C depicts openings 425 positioned in the lower side of VFD enclosure 415. In some such embodiments, openings 425 may, for example and without limitation, allow for electrical or communication cables or cooling lines to be run from the interior of VFD enclosure 415 to other areas of integrated fracking system 100 such as, for example and without limitation, via cable tray 131 to pump subsystem 200. VFD 417 may provide power to motor 203 and may control the operation of motor 203 by, for example and without limitation, controlling the speed and torque of motor 203 and thereby the pump rate of frac pump 201 by varying the voltage and current supplied to motor 203 and by varying the frequency of the power supplied to motor 203.

In some embodiments, as shown in FIGS. 14 and 14A, VFD enclosure 415 may include bellows assembly 427. Bellows assembly 427 may, for example and without limitation, provide protection for electrical connections extending between VFD subsystem 400 and transformer subsystem 500. In some such embodiments, bellows assembly 427 may be positioned to extend between VFD enclosure 415 and transformer enclosure 501. In other embodiments, power may be supplied between transformer subsystem 500 and VFD subsystem 400 by other routing.

VFD 417 may, in some embodiments, be controlled by an operator positioned on VFD platform 403, may be controlled remotely, or may operate at least partially autonomously in response to predetermined operating parameters. In some embodiments in which VFD 417 is controlled remotely, VFD 417 may be controlled by a central control system used to manage multiple integrated fracking systems 100 positioned in a wellsite. In some embodiments, VFD subsystem 400 may include a radiator and fan assembly for thermal management of VFD 417.

In some embodiments, as shown in FIG. 1, VFD subsystem 400 may include unit control system 429. Unit control system 429 may be accessible from VFD platform 403 of VFD subsystem 400. In some embodiments, an operator may control one or more aspects of the operation of integrated fracking system 100 through unit control system 429. In some embodiments, for example and without limitation, unit control system 429 may be operatively coupled to other subsystems of integrated fracking system 100 through one or more communication cables.

Figure 19:
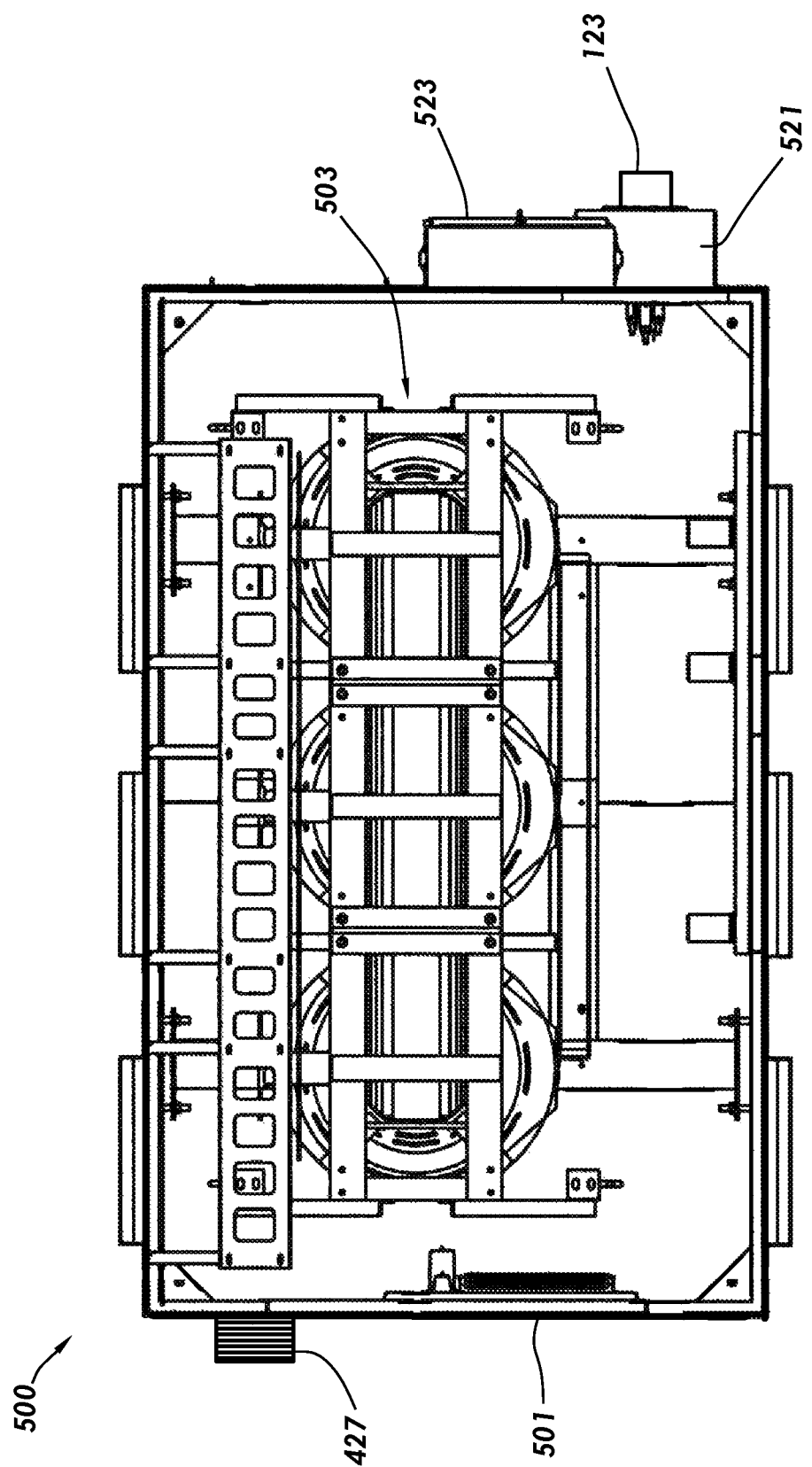
FIG. 19 depicts a top view of the transformer subsystem of FIG. 16 with the top thereof removed.
Figure 20:
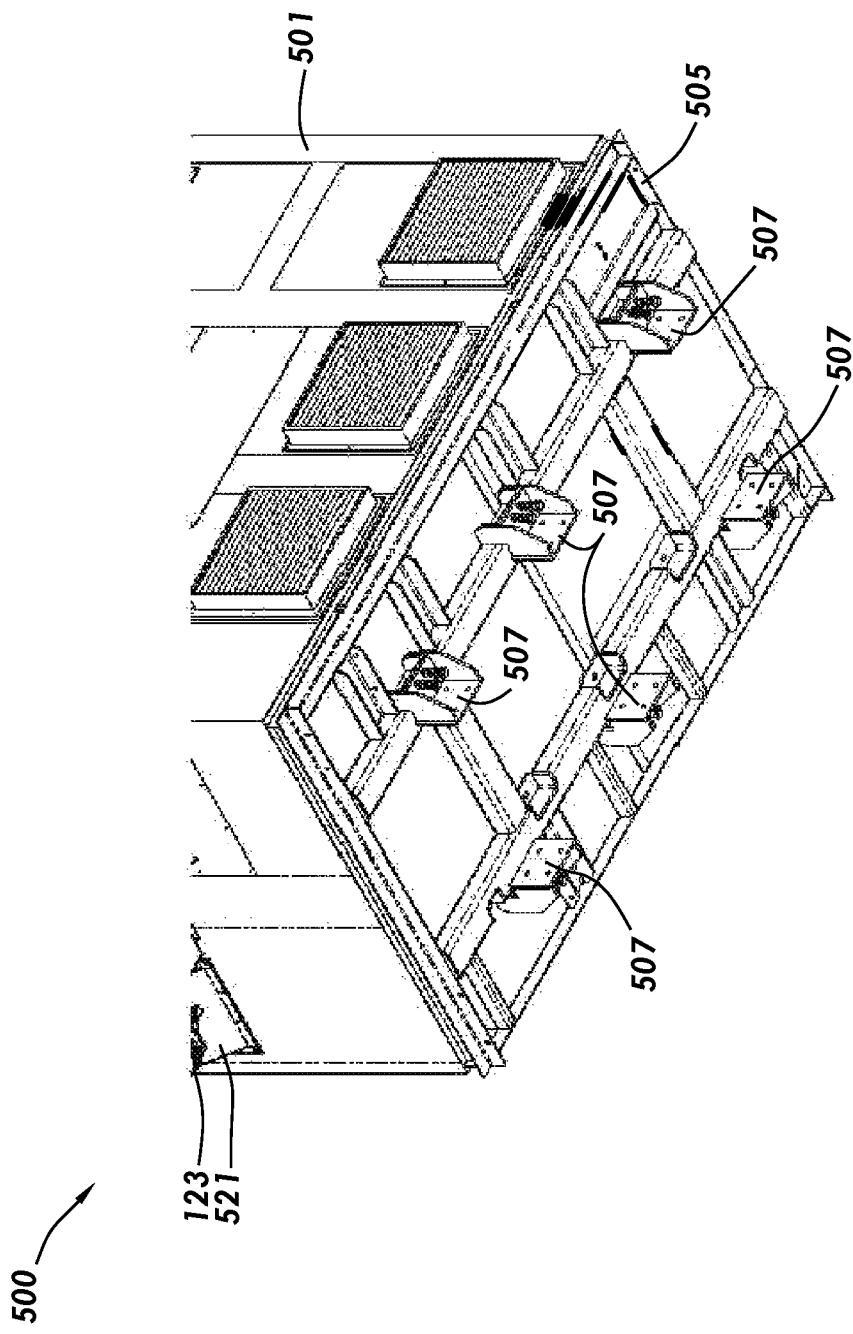
FIG. 20 depicts a perspective view of the bottom of the transformer subsystem of FIG. 16.

In some embodiments, with respect to FIG. 1, integrated fracking system 100 may include transformer subsystem 500. Transformer subsystem 500, as shown in FIGS. 16-20, may include transformer enclosure 501. Transformer enclosure 501 may house transformer 503 (as shown in FIG. 19), may protect transformer 503 from the surrounding environment, and may protect users from the high voltages found within transformer enclosure 501 during operation of transformer 503.

In some embodiments, transformer subsystem 500 may include transformer base 505. Transformer base 505 may support transformer enclosure 501 and transformer 503. Transformer base 505 may be coupled to frame rails 103 of substructure assembly 101. In some embodiments, transformer base 505 may be coupled to substructure assembly 101 via isolation mounts 507 as shown in FIGS. 17, 18, 20, and 21. Isolation mounts 507 may, for example, provide vibration and motion damping between transformer subsystem 500 and substructure assembly 101 during transportation of integrated fracking system 100. Such damping may, without being bound to theory, mitigate the risk of damaging transformer 503 as well as causing damage to substructure assembly 101 due to movement or torsional loading caused by transformer subsystem 500 during travel over uneven terrain. In some embodiments, damping may further reduce transmission of vibrations caused by transformer 503 to the rest of integrated fracking system 100 during operation of transformer 503.

Figure 21:
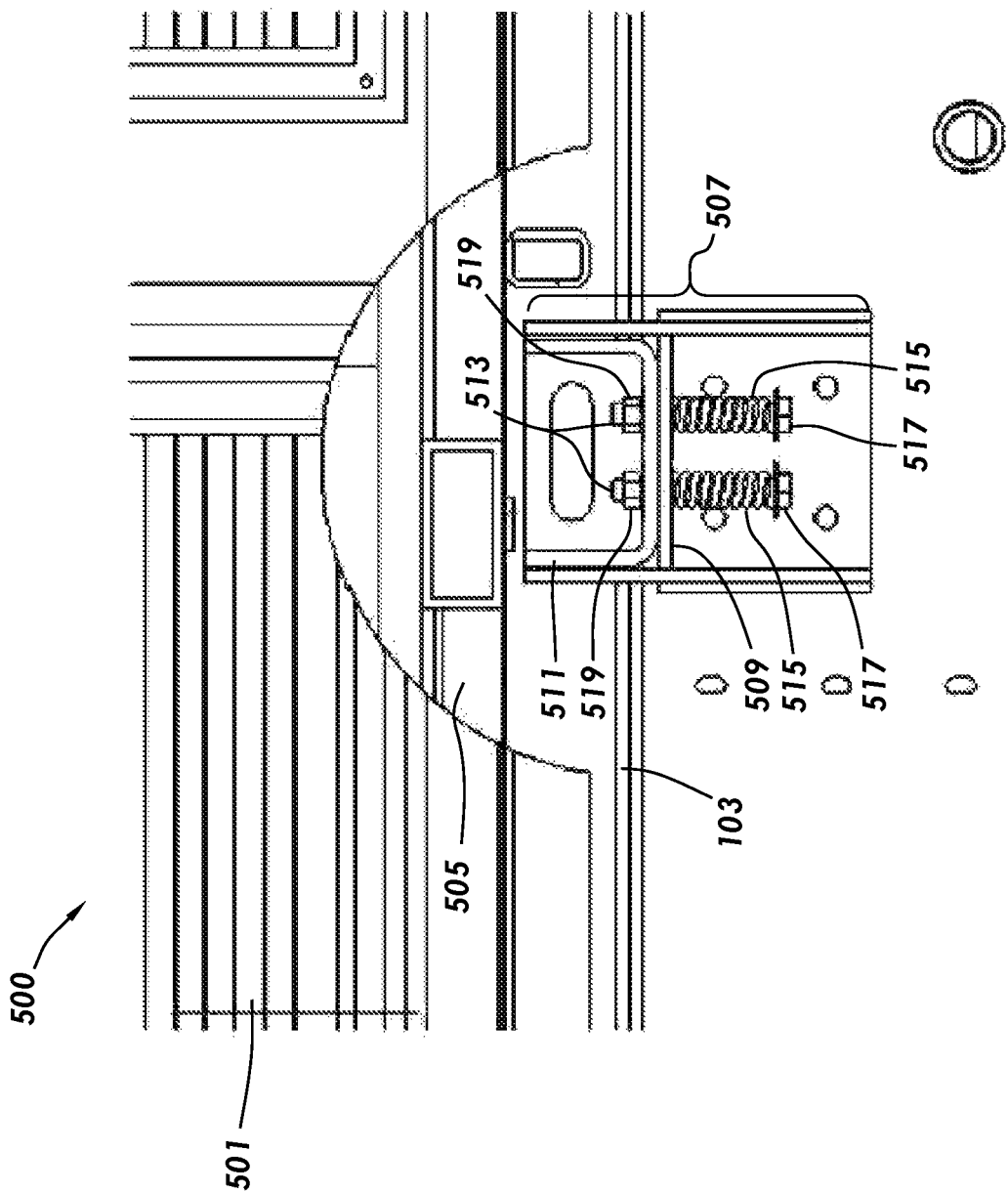
FIG. 21 depicts a detail view of a vibration isolator consistent with at least one embodiment of the present disclosure.

As shown in detail in FIG. 21, isolation mounts 507 may, in some embodiments, include transformer brace 509 coupled to transformer base 505 and substructure brace 511 coupled to substructure assembly 101. In some embodiments, transformer brace 509 may be coupled to substructure brace 511 by one or more bolts 513 such that transformer brace 509 is located beneath substructure brace 511. One or more springs 515 may be positioned between heads 517 of bolts 513 and transformer brace 509 such that transformer brace 509 is suspended beneath substructure brace 511 and supported by springs 515. Bolts 513 may be secured to substructure brace 511 by nuts 519. In some embodiments, springs 515 are positioned around bolts 513 such that springs 515 are retained to bolts 513. The connection of transformer base 505 to substructure assembly 101 through springs 515 may thereby provide the movement and vibration damping described above. In the case of failure of one or more isolation mounts 507, because transformer base 505 is positioned above substructure assembly 101, transformer subsystem 500 may remain supported by and coupled to substructure assembly 101.

With reference to FIGS. 16-19, transformer enclosure 501 may include front power receptacle 123 as discussed above in the form of receptacle well 521. Receptacle well 521 may, in some embodiments, be angled downward to, for example and without limitation, improve connectivity. Receptacle well 521 may be electrically coupled to transformer 503 and may thereby provide the power input to transformer 503. In some embodiments, for example and without limitation, transformer 503 may be used to increase or decrease voltages supplied thereto for use by other components of integrated fracking system 100. In some embodiments, power output from transformer 503 may be routed to other components of integrated fracking system 100 via cable tray 121 as discussed herein above.

In some embodiments, transformer enclosure 501 may include primary breaker 523. Primary breaker 523 may be located on the exterior of transformer enclosure 501. Primary breaker 523 may be operatively coupled to the input power supply supplied to integrated fracking system 100 and may, for example and without limitation, be adapted to break the electrical connection thereto upon certain predetermined conditions such as where current draw is above a preselected threshold. Primary breaker 523 may, for example and without limitation, provide safety for other systems of integrated fracking system 100 resulting from electric anomalies in the supply of power to transformer 503 or power supplied from transformer 503.

Figure 22:
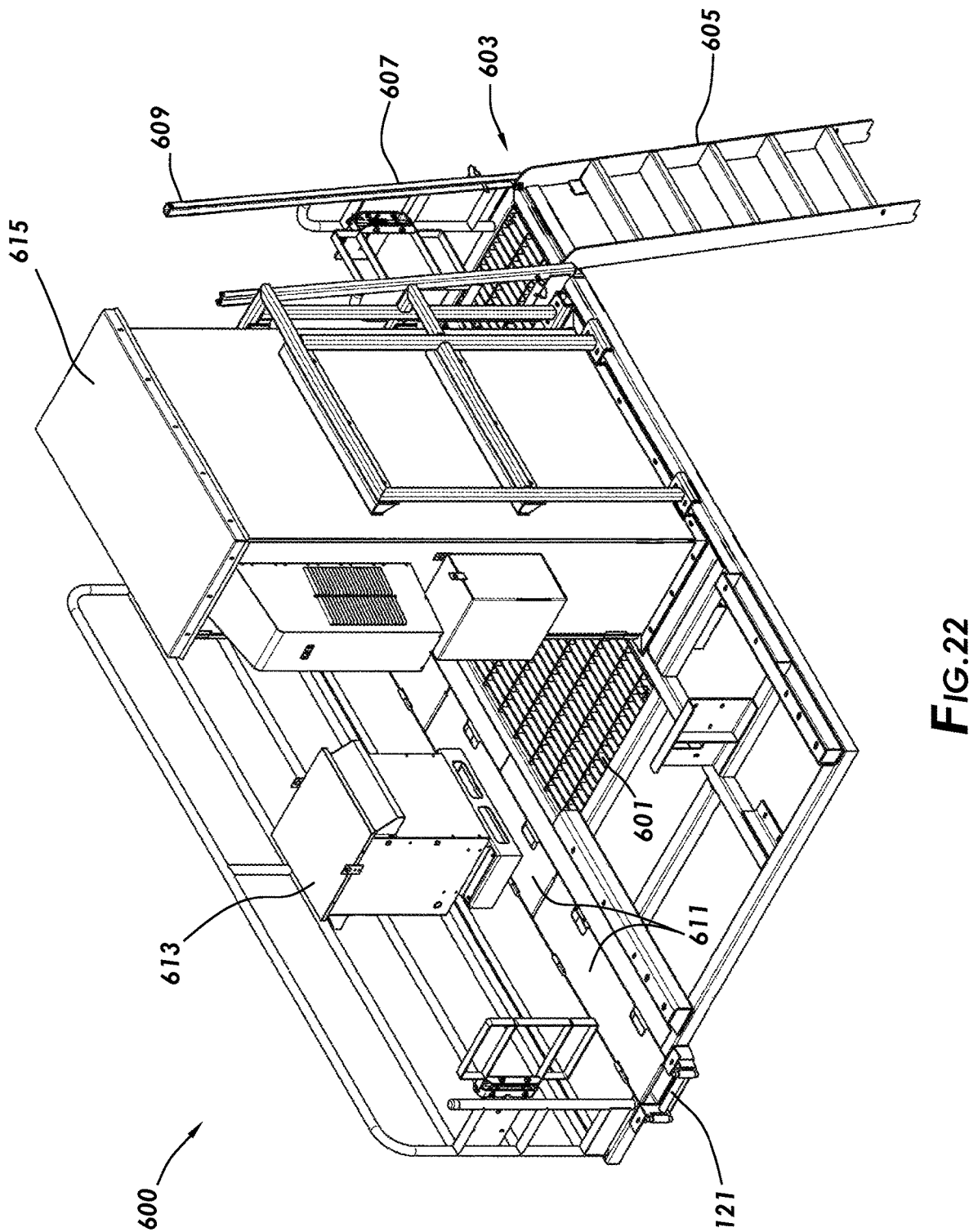
FIG. 22 depicts a perspective view of a front platform subsystem of an integrated fracking system consistent with at least one embodiment of the present disclosure.

With reference to FIG. 1, in some embodiments, integrated fracking system 100 may include front platform subsystem 600. Front platform subsystem 600, as depicted in FIG. 22, may include platform 601. Platform 601 may be coupled to substructure assembly 101. Platform 601 may be accessible from the ground by ladder assembly 603. Ladder assembly 603 may include ladder 605 and handrails 607. Handrails 607 may be rigidly coupled to and may extend upward from platform 601. In some embodiments, ladder 605 may be pivotably coupled to platform 601 such that ladder 605 may pivot between a raised position and a lowered position. In other embodiments, ladder 605 may be slidingly coupled to handrails 607 such that ladder 605 may slide between the raised and lowered positions. When in the raised position, ladder 605 may be located within the perimeter of platform 601. When in the lowered position, ladder 605 may extend from platform 601 to the ground such that platform 601 may be accessible via ladder 605. In some embodiments, ladder 605 may extend to the ground at an angle from platform 601, In such an embodiment, use of ladder 605 may be simplified as compared to a vertical ladder.

In some embodiments, ladder 605 may be positioned within handrails 607 when ladder 605 is in the raised position. In some embodiments, one or more retaining mechanisms 609 may be positioned in ladder 605 or handrails 607 which may be used to retain ladder 605 in the raised position.

In some embodiments, platform 601 of front platform subsystem 600 may include one or more hinged floor panels 611. Hinged floor panels 611 may, for example and without limitation, allow for access to cable tray 121 which may pass beneath platform 601.

In some embodiments, one or more secondary transformers 613 may be positioned on front platform subsystem 600. Secondary transformers 613 may, for example and without limitation, provide electrical power to other systems including, for example and without limitation, lubricant cooling circuit 721, VFD cooling circuit 711, and motor cooling system 211 on integrated fracking system 100 at voltages other than those output by transformer 503.

In some embodiments, integrated motor controller (IMC) 615 may be positioned on front platform subsystem 600. In some such embodiments, IMC 615 may be used to control the operation of motor operations of any motors positioned on integrated fracking system 100 (other than motor 203, which is controlled by VFD 417 as discussed above) including, but not limited to, motors associated with leveling system 111, movable platform 301, cooling fan 705 as discussed below, or any other motors. In some embodiments, IMC 615 may be controlled by an operator on platform 601 or may be controlled by unit control system 429.

Figure 23:
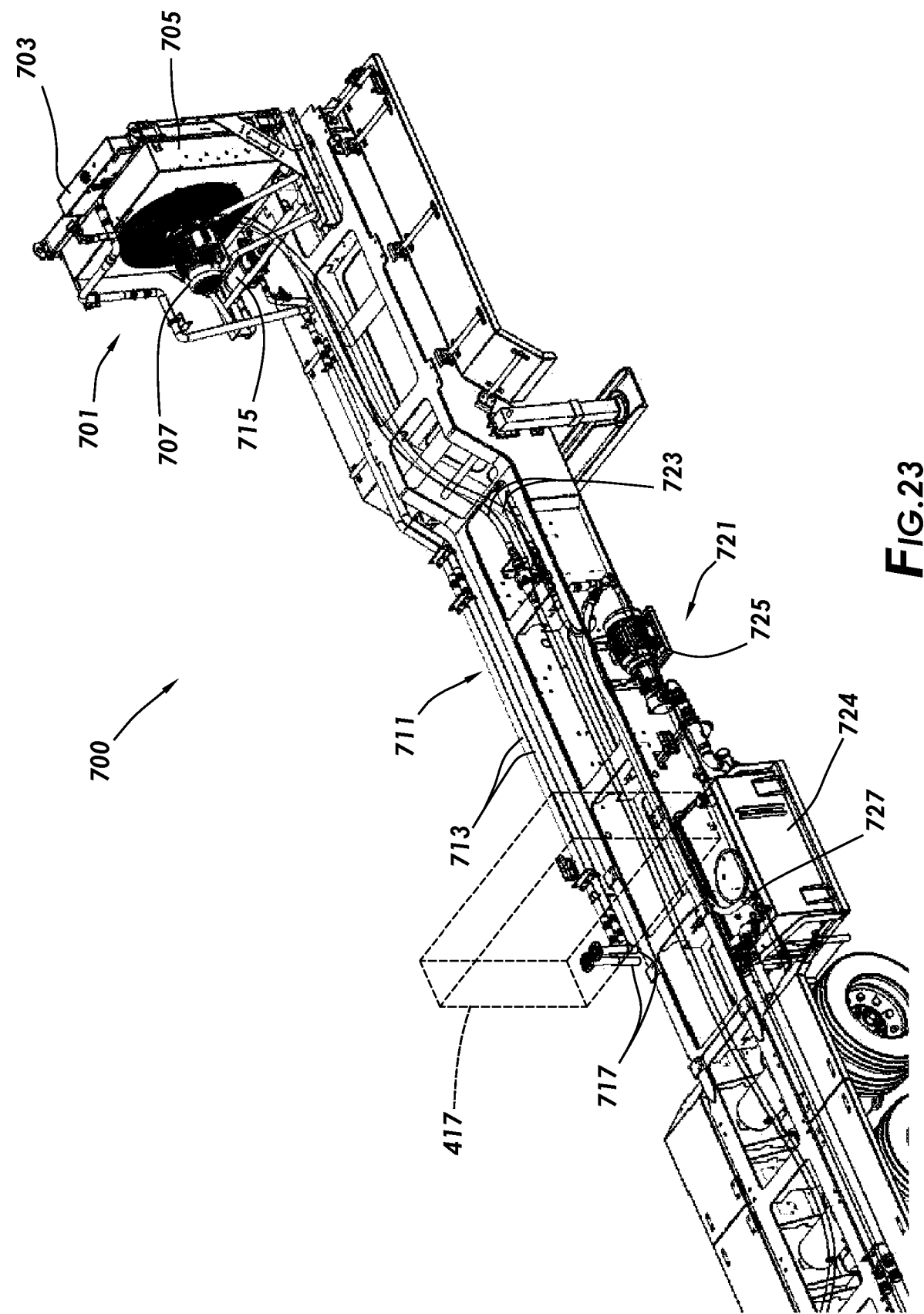
FIG. 23 depicts a perspective view of a cooling subsystem of an integrated fracking system consistent with at least one embodiment of the present disclosure.
Figure 24:
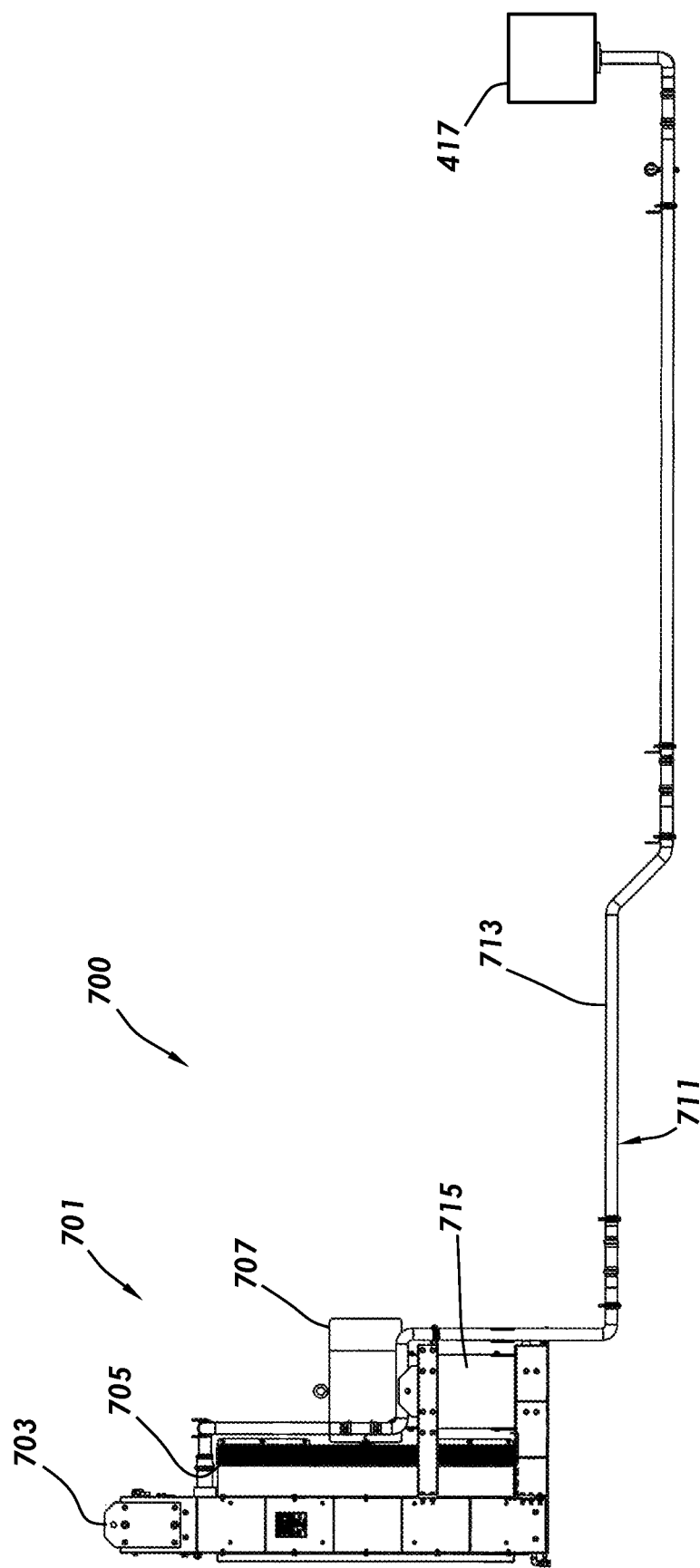
FIG. 24 depicts a partial side elevation view of the cooling subsystem of FIG. 23.
Figure 25:
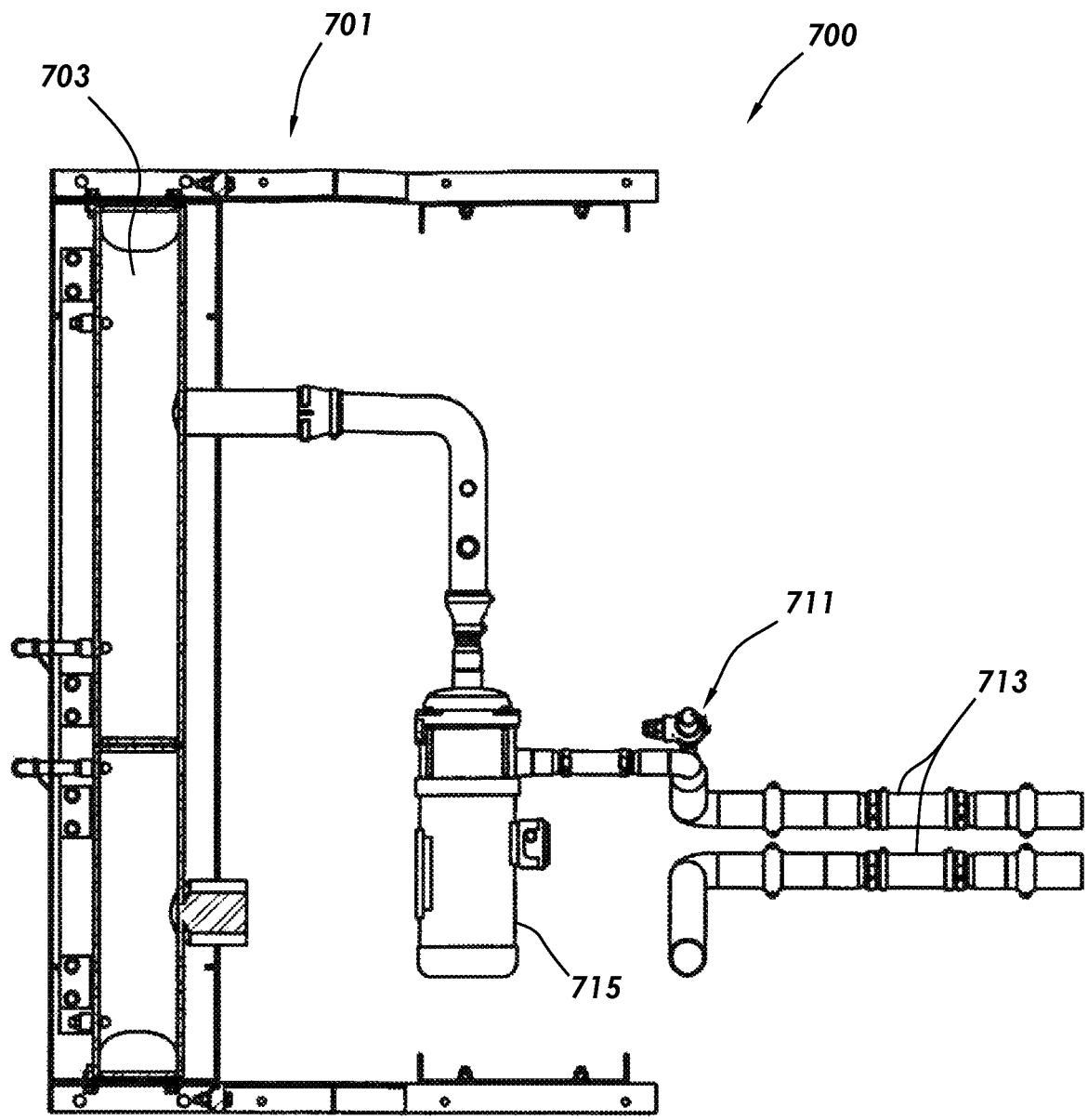
FIG. 25 depicts a partial cutaway top view of the cooling subsystem of FIG. 23.

With reference to FIG. 1, integrated fracking system 100 may include cooling subsystem 700. In certain embodiments, cooling subsystem 700 may be coupled to frame rails 103. In some embodiments, cooling subsystem 700 may include radiator assembly 701. In some embodiments, radiator assembly 701 may be positioned at the front end of substructure assembly 101 on gooseneck 109. As shown in FIGS. 23-25, radiator assembly 701 may include radiator 703 and cooling fan 705. Cooling fan 705 may be driven by cooling fan motor 707. Cooling fan motor 707 may be a constant speed or variable speed motor. In some embodiments, cooling fan motor 707 may be controlled by cooling fan controller 709 (shown in FIG. 4 positioned at front platform subsystem 600) which may, in some embodiments, control the operation of cooling fan motor 707 in response to one or more variables including, for example and without limitation, the temperature of one or more fluids flowing through radiator 703 with regard to one or more preprogrammed temperature settings. In embodiments in which cooling fan motor 707 is a variable speed motor, cooling fan controller 709 may vary the speed of rotation of cooling fan 705 in response to the one or more variables.

In some embodiments, cooling subsystem 700 may include VFD cooling circuit 711 configured to provide temperature control for VFD 417. VFD cooling circuit 711 may allow for quieter operation of VFD subsystem 400 as compared to a traditional air-cooled VFD in that such air-cooled VFD systems rely on one or more blowers to move air through the respective VFD. By using VFD cooling circuit 711, such noise of dedicated blowers may be eliminated as such blowers may not be necessary.

In some embodiments, VFD cooling circuit 711 may include VFD cooling lines 713. VFD cooling lines 713 may extend between radiator assembly 701 and VFD subsystem 400. In such an embodiment, VFD 417 may be cooled by the circulation of a coolant through VFD 417. In some embodiments, the coolant may be water or may be at least partially glycol-based. The coolant may flow from VFD 417 to radiator assembly 701 and back again through VFD cooling lines 713. In some embodiments, cooling subsystem 700 may include coolant pump 715. Coolant pump 715 may operate to circulate the coolant through VFD 417, VFD cooling lines 713, and radiator assembly 701. In some embodiments, coolant may be heated as it travels through VFD 417 and may be cooled as it travels through radiator 703. Depending on ambient conditions and the temperature of coolant as it enters radiator 703, cooling fan 705 may be operated to provide forced convection through radiator 703, thereby increasing the cooling rate of coolant as it passes through radiator 703.

In some embodiments, cooling subsystem 700 may include one or more heating elements 717. Heating elements 717 may be immersion heating elements and may be adapted to heat coolant as it circulates through VFD cooling circuit 711. In some embodiments, such heating may be used to, for example and without limitation, mitigate the risk of condensation within VFD 417 due to ambient conditions.

In some embodiments, cooling subsystem 700 may include lubricant cooling circuit 721 configured to provide cooling of lubricant used in frac pump 201. In some embodiments, lubricant cooling circuit 721 may also be used to cool motor 203. In some embodiments, lubricant cooling circuit 721 may include lubricant cooling lines 723. Lubricant cooling lines 723 may extend between radiator assembly 701 and lubricant tank 724. In such an embodiment, lubricant used by frac pump 201 may be cooled by the circulation of the lubricant through cooling subsystem 700. The lubricant may flow from pump subsystem 200 into lubricant tank 724, and then from lubricant tank 724 to radiator assembly 701 and back again through lubricant cooling lines 723. In some embodiments, cooling subsystem 700 may include lubricant pump 725. Lubricant pump 725 may operate to circulate the lubricant from lubricant tank 724 through pump subsystem 200, lubricant cooling lines 723, and radiator assembly 701. In some embodiments, lubricant may be heated as it travels through pump subsystem 200 and may be cooled as it travels through radiator 703. Depending on ambient conditions and the temperature of lubricant as it enters radiator 703, cooling fan 705 may be operated to provide forced convection through radiator 703, thereby increasing the cooling rate of lubricant as it passes through radiator 703.

In some embodiments, cooling subsystem 700 may include one or more lubricant heating elements 727. Lubricant heating elements 727 may be immersion heating elements positioned in lubricant tank 724 and may be adapted to heat lubricant. In some embodiments, such heating may be used to, for example and without limitation, prevent seizing of the lubricant such as when integrated fracking system 100 is operated in cold conditions.

Because both VFD cooling circuit 711 and lubricant cooling circuit 721 use the same radiator assembly 701, only a single radiator assembly 701 is needed for the operation of all systems of integrated fracking system 100. Such an arrangement may, for example and without limitation, reduce the overall noise produced by integrated fracking system 100 and may reduce energy requirements for providing the necessary cooling for operating integrated fracking system 100. In other embodiments, VFD cooling circuit 711 and lubricant cooling circuit 721 may use separate radiator assemblies 701.

Figure 26:
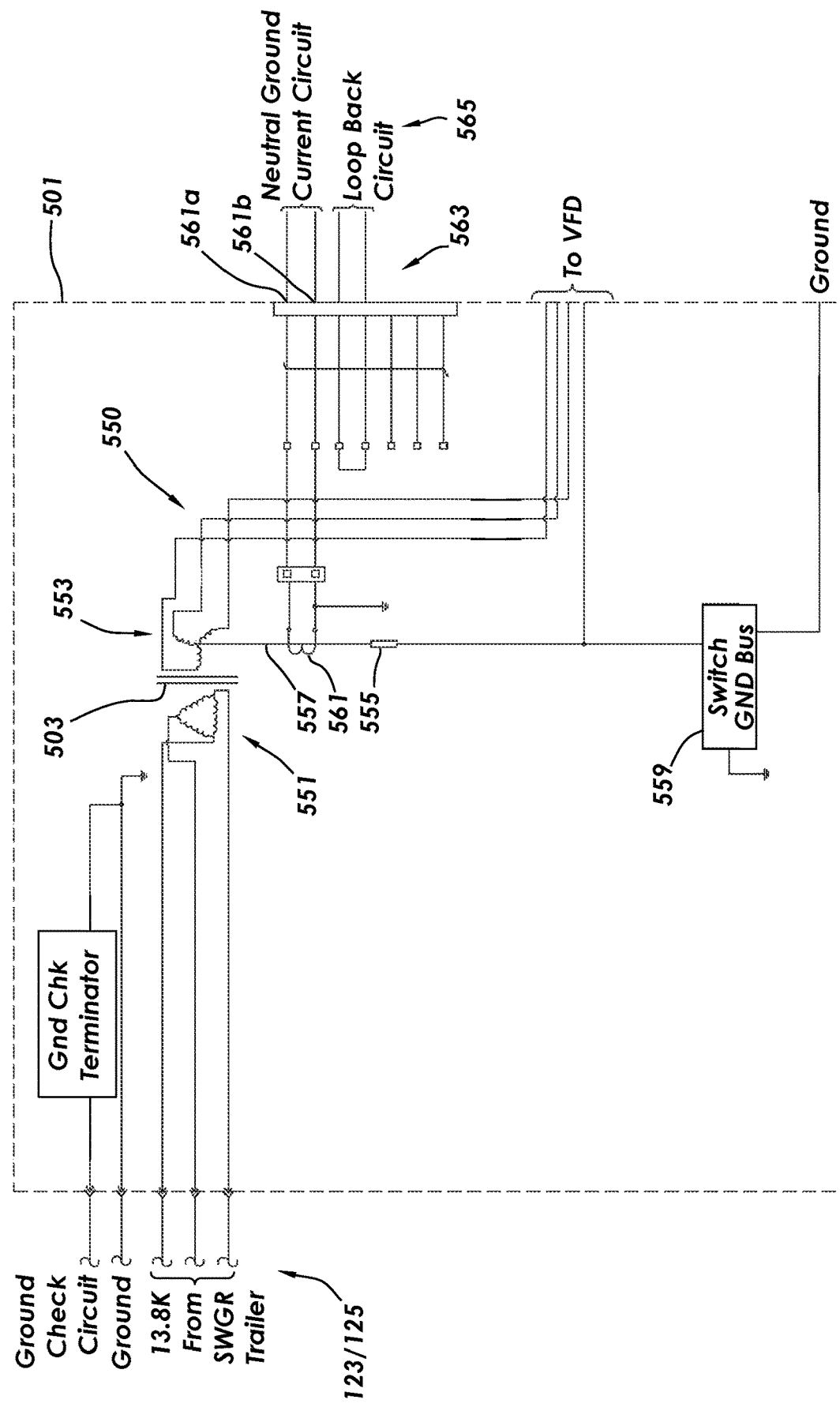
FIG. 26 is a schematic of a transformer subsystem of an integrated fracking system consistent with at least one embodiment of the present disclosure.

FIG. 26 is a schematic view for a non-limiting example of part of electrical system 550 of integrated fracking system 100 consistent with at least one embodiment of the present disclosure. Transformer 503 is shown within transformer enclosure 501. Transformer 503 includes primary windings 551 and secondary windings 553. Power may be provided to transformer 503 from external switchgear via front or rear power receptacle 123/125.

In some embodiments, electrical system 550 may include neutral ground resistor 555. Neutral ground resistor 555 may be electrically coupled between neutral wire 557 of secondary coil 553 and ground bus 559. Neutral ground resistor 555 may, for example and without limitation, limit ground fault current from secondary windings 553. Such current limiting may, for example and without limitation, provide for personnel and equipment protection.

In some embodiments, current sense inductor 561 may be positioned to measure current flowing through neutral wire 557. In some embodiments, the voltage differential between terminals 561a, 561b of current sense inductor 561 may indicate the current passing through neutral wire 557. In some embodiments, the external switchgear may use current sense inductor 561 to measure the current through neutral wire 557 and, for example, in the case that current flowing through neutral wire 557 is above a predetermined trip setpoint for at least a predetermined amount of time, a breaker in the switchgear may be tripped such that power supplied to integrated fracking system 100 is cut off. In some embodiments, the external switchgear may couple to electrical system 550 by connector 563, which includes loopback circuit 565. Loopback circuit 565 may be internally shorted such that the external switchgear can detect when connector 563 is properly coupled to electrical system 550.

Figure 27:
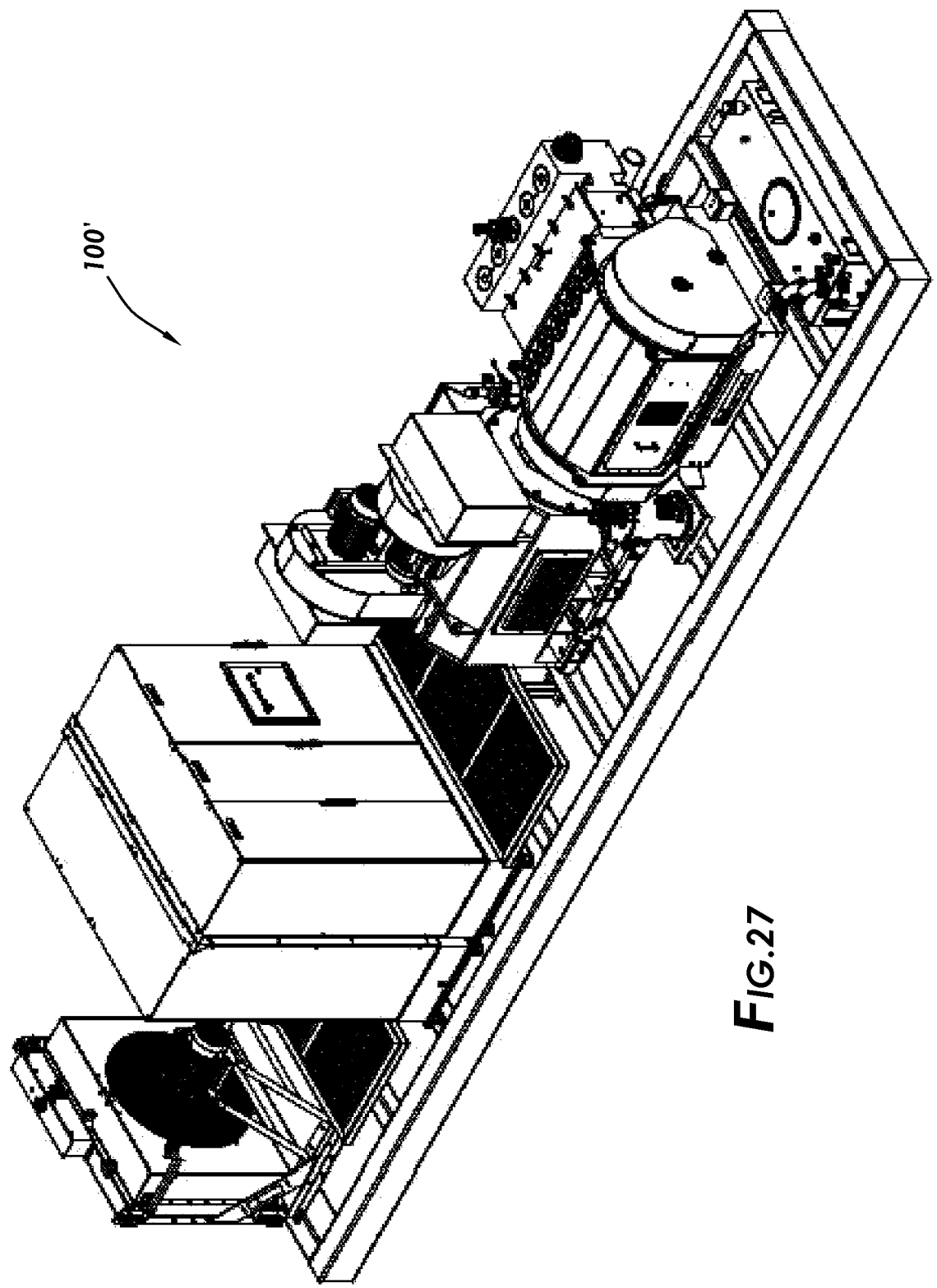
FIG. 27 depicts a perspective view of an integrated fracking system consistent with at least one embodiment of the present disclosure.
Figure 28:
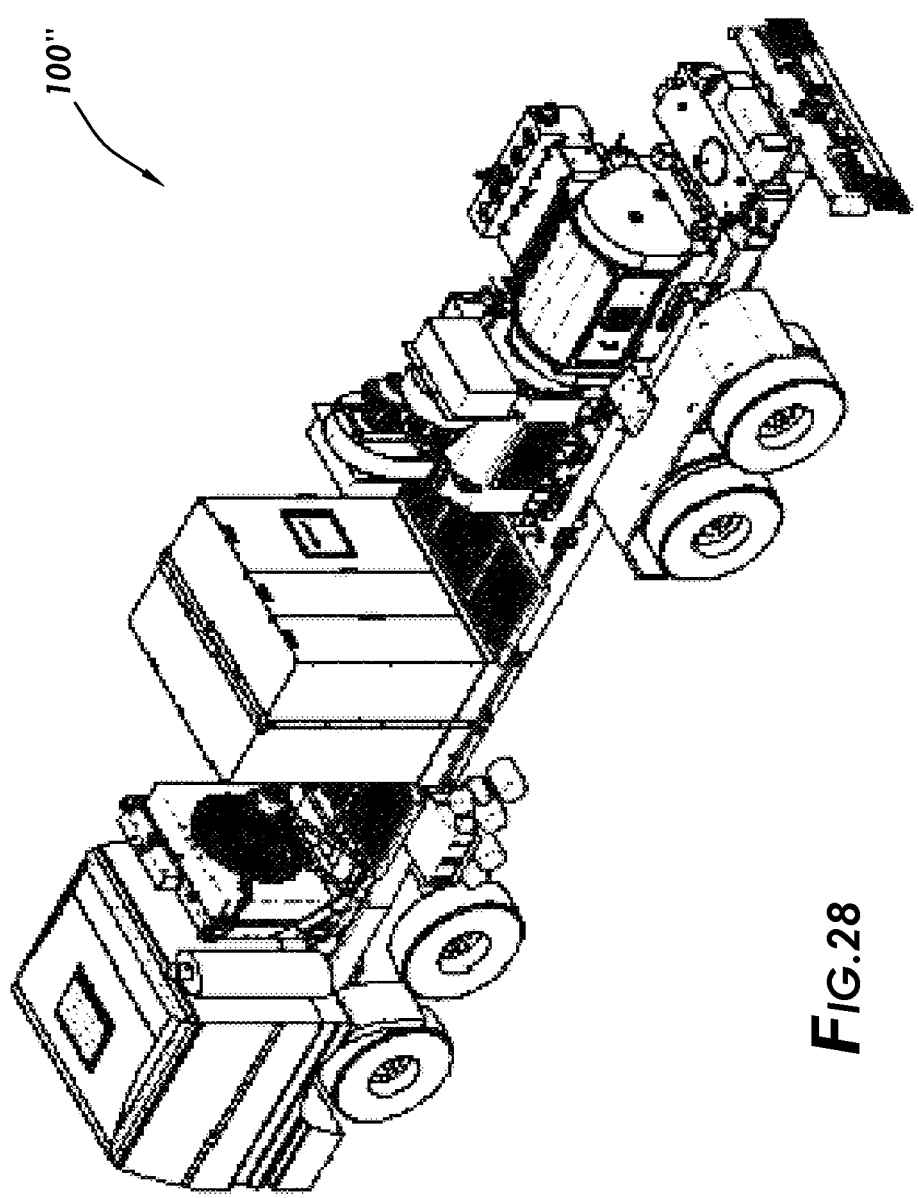
FIG. 28 depicts a perspective view of an integrated fracking system consistent with at least one embodiment of the present disclosure.

Although described herein above primarily with respect to embodiments of integrated fracking system 100 formed as a trailer, other configurations of integrated fracking system 100 are contemplated herein. For example and without limitation, in some embodiments, integrated fracking system 100' may be formed as a skid as shown in FIG. 27. In some such embodiments, transformer subsystem 500 be omitted as, for example and without limitation, integrated fracking system 100' may be operated onboard a vessel that may natively provide power usable by VFD subsystem 400. In some embodiments, integrated fracking system 100" may be formed as part of a truck as shown in FIG. 28.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. An integrated fracking system comprising:
a substructure assembly including a plurality of frame rails;
a pump subsystem including a frac pump and a motor, the pump subsystem coupled to the frame rails of the substructure assembly;
a variable frequency drive (VFD) coupled to the frame rails of the substructure assembly;
a transformer coupled to the frame rails of the substructure assembly;
a cooling subsystem coupled to the frame rails of the substructure assembly; and
a cable tray, the cable tray directly coupled to and between the frame rails of the substructure assembly, the cable tray supporting one or more cables therein, the one or more cables operatively coupled to the VFD, transformer, and pump subsystem.

2. The integrated fracking system of claim 1, wherein the substructure assembly is part of a skid.

3. The integrated fracking system of claim 1, wherein the substructure assembly comprises wheels.

4. The integrated fracking system of claim 1, wherein the substructure assembly further comprises a coupler, the coupler adapted to couple the substructure assembly to a truck.

5. The integrated fracking system of claim 1, wherein the substructure assembly further comprises a leveling system, the leveling system including at least one leg, the leg being extendable and retractable such that substructure assembly may be leveled.

6. The integrated fracking system of claim 1, further comprising a primary input cable, the primary input cable extending at least partially between a front end of the cable tray or a rear end of the cable tray and the transformer, the primary input cable operatively coupled to the transformer, the primary input cable positioned to receive electrical power from an external source.

7. The integrated fracking system of claim 6, wherein the primary input cable comprises a front power receptacle, a rear power receptacle, or a front power receptacle and a rear power receptacle.

8. The integrated fracking system of claim 1, further comprising a cable tray, the cable tray directly coupled to the frame rails of the substructure assembly, the cable tray extending between the VFD and the pump subsystem.

9. The integrated fracking system of claim 1, wherein the pump subsystem further comprises a frac pump skid, the frac pump coupled to the frame rails via the frac pump skid.

10. The integrated fracking system of claim 9, wherein the frac pump skid is selectively decoupleable from the frame rails.

11. The integrated fracking system of claim 1, further comprising a slide-out platform subsystem, the slide-out platform subsystem including a movable platform, the movable platform slidingly coupled to the frame rails by one or more slide rails.

12. The integrated fracking system of claim 11, wherein the movable platform is movable between a retracted position and an extended position by an actuator.

13. The integrated fracking system of claim 12, wherein the actuator is a screw drive, chain drive, worm drive, or a linear actuator.

14. The integrated fracking system of claim 12, wherein the actuator is electrically powered.

15. The integrated fracking system of claim 11, wherein the movable platform includes one or more safety railings.

16. The integrated fracking system of claim 11, wherein the movable platform includes a ladder assembly, the ladder assembly comprising a ladder and handrails, the handrails rigidly coupled to a floor of the movable platform, the ladder movable between a lowered position and a raised position.

17. The integrated fracking system of claim 16, wherein the ladder is slidingly coupled to the handrails.

18. The integrated fracking system of claim 16, wherein the ladder is pivotably coupled to the floor or the handrails.

19. The integrated fracking system of claim 16, wherein the handrails further comprise a retaining mechanism.

20. The integrated fracking system of claim 19, wherein the retaining mechanism comprises a shaft, the shaft extending through a hole formed in the handrails and the ladder when in the locked position.

21. The integrated fracking system of claim 20, wherein the shaft is a bolt.

22. The integrated fracking system of claim 16, further comprising a safety gate, the safety gate pivotably coupled to the movable platform, the safety gate positioned to extend across the opening between the handrails.

23. The integrated fracking system of claim 11, wherein the movable platform is positioned adjacent to the pump subsystem.

24. The integrated fracking system of claim 1, wherein the VFD is coupled to the frame rails through a VFD platform.

25. The integrated fracking system of claim 24, further comprising a ladder assembly, the ladder assembly comprising a ladder and handrails, the handrails rigidly coupled to the VFD platform, the ladder movable between a lowered position and a raised position, wherein the ladder is at an angle when in the lowered position.

26. The integrated fracking system of claim 25, wherein the ladder is slidingly coupled to the handrails.

27. The integrated fracking system of claim 25, wherein the ladder is pivotably coupled to the floor or the handrails.

28. The integrated fracking system of claim 25, wherein the handrails further comprise a retaining mechanism.

29. The integrated fracking system of claim 28, wherein the retaining mechanism comprises a shaft, the shaft extending through a hole formed in the handrails and the ladder when in the locked position.

30. The integrated fracking system of claim 29, wherein the shaft is a bolt.

31. The integrated fracking system of claim 24, further comprising an environmental shelter coupled to the VFD platform, the environmental shelter including a canopy.

32. The integrated fracking system of claim 31, wherein the canopy is removable from the environmental shelter.

33. The integrated fracking system of claim 31, wherein the canopy comprises two or more canopy sections, each canopy section independently removable from the environmental shelter.

34. The integrated fracking system of claim 33, wherein a first canopy section covers the VFD and a second canopy section covers the VFD platform adjacent to the VFD.

35. The integrated fracking system of claim 24, wherein the VFD is positioned within a VFD enclosure, wherein the VFD enclosure is coupled to the VFD platform by one or more vibration isolation mounts.

36. The integrated fracking system of claim 35, wherein the VFD enclosure includes one or more openings adapted to receive electrical power cables.

37. The integrated fracking system of claim 36, wherein each opening includes a bellows assembly.

38. The integrated fracking system of claim 35, wherein the VFD enclosure further comprises one or more power connections.

39. The integrated fracking system of claim 24, further comprising a unit control system, the unit control system coupled to the VFD platform.

40. The integrated fracking system of claim 1, wherein the transformer is positioned within a transformer enclosure.

41. The integrated fracking system of claim 40, wherein the transformer enclosure comprises a receptacle well.

42. The integrated fracking system of claim 40, wherein the transformer enclosure comprises a primary breaker, the primary breaker operatively coupled to an input power supply and adapted to break the electrical connection upon certain predetermined conditions.

43. The integrated fracking system of claim 1, further comprising a neutral ground resistor, the neutral ground resistor electrically coupled between the secondary of the transformer and the ground, the neutral ground resistor adapted to limit fault current in the event that components of the integrated fracking system are unintentionally grounded.

44. The integrated fracking system of claim 1, further comprising a transformer base, wherein the transformer is supported by the transformer base and the transformer base is coupled to the frame rails.

45. The integrated fracking system of claim 44, wherein the transformer base is coupled to the frame rails by an isolation mount.

46. The integrated fracking system of claim 44, wherein the isolation mount comprises:
a transformer brace coupled to the transformer base;
a substructure brace coupled to the frame rails, the substructure brace positioned above the transformer brace;
a bolt extending through holes formed in the transformer brace and the substructure brace;
a spring, the spring positioned about the bolt, the spring extending between a head of the bolt and the transformer brace; and
a nut, the nut securing the bolt to the substructure brace;
wherein the transformer brace is suspended from the substructure brace, the transformer brace supported by the spring and the head of the bolt.

47. The integrated fracking system of claim 1, further comprising a front platform subsystem, the front platform subsystem including a platform.

48. The integrated fracking system of claim 47, wherein the front platform subsystem includes a ladder assembly, the ladder assembly comprising a ladder and handrails, the handrails rigidly coupled to the platform, the ladder movable between a lowered position and a raised position, wherein the ladder is at an angle when in the lowered position.

49. The integrated fracking system of claim 48, wherein the ladder is slidingly coupled to the handrails.

50. The integrated fracking system of claim 48, wherein the ladder is pivotably coupled to the floor or the handrails.

51. The integrated fracking system of claim 48, wherein the handrails further comprise a retaining mechanism adapted to retain the ladder in the raised position.

52. The integrated fracking system of claim 51, wherein the retaining mechanism comprises a shaft, the shaft extending through a hole formed in the handrails and the ladder when in the locked position.

53. The integrated fracking system of claim 52, wherein the shaft is a bolt.

54. The integrated fracking system of claim 47, wherein the platform comprises one or more hinged floor panels, the hinged floor panels positioned to allow access to components of the integrated fracking system below the platform.

55. The integrated fracking system of claim 47, wherein the front platform subsystem includes a secondary transformer.

56. The integrated fracking system of claim 47, wherein the front platform subsystem includes an integrated motor controller, the integrated motor controller configured to control the operation of one or more motors of the integrated fracking system.

57. The integrated fracking system of claim 1, wherein the cooling subsystem comprises a radiator assembly, the radiator assembly including a radiator, a cooling fan, and a cooling fan motor.

58. The integrated fracking system of claim 57, further comprising a cooling fan controller.

59. The integrated fracking system of claim 57, wherein the cooling fan motor is a constant speed or a variable speed motor.

60. The integrated fracking system of claim 1, wherein the cooling subsystem comprises a VFD cooling circuit, the VFD cooling circuit including cooling lines, the cooling lines extending between a radiator of the cooling subsystem and the VFD.

61. The integrated fracking system of claim 60, wherein the VFD cooling circuit further comprises a coolant pump.

62. The integrated fracking system of claim 60, wherein the VFD cooling circuit further comprises one or more heaters, the heaters adapted to heat a coolant flowing through the VFD cooling circuit.

63. The integrated fracking system of claim 1, wherein the cooling subsystem comprises a lubricant cooling circuit, the lubricant cooling circuit including cooling lines, the cooling lines extending between a radiator of the cooling subsystem and the frac pump.

64. The integrated fracking system of claim 60, wherein the lubricant cooling circuit further comprises a lubricant pump.

65. The integrated fracking system of claim 60, wherein the lubricant cooling circuit further comprises one or more heaters, the heaters adapted to heat a lubricant flowing through the lubricant cooling circuit.

* * * * *